(12) United States Patent
Wengerter et al.

(10) Patent No.: US 11,477,767 B2
(45) Date of Patent: Oct. 18, 2022

(54) CONTROL CHANNEL SIGNALING USING A COMMON SIGNALING FIELD FOR TRANSPORT FORMAT, REDUNDANCY VERSION, AND NEW DATA INDICATOR

(71) Applicant: Optis Wireless Technology, LLC, Plano, TX (US)

(72) Inventors: Christian Wengerter, Kleinheubach (DE); Akihiko Nishio, Kanagawa (JP); Hidetoshi Suzuki, Kanagawa (JP); Joachim Löhr, Wiesbaden (DE); Katsuhiko Hiramatsu, Kanagawa (JP)

(73) Assignee: Optis Wireless Technology, LLC, Plano, TX (US)

( * ) Notice: Subject to any disclaimer, the term of this patent is extended or adjusted under 35 U.S.C. 154(b) by 386 days.

(21) Appl. No.: 16/826,731

(22) Filed: Mar. 23, 2020

(65) Prior Publication Data
US 2020/0221454 A1 Jul. 9, 2020

Related U.S. Application Data

(63) Continuation of application No. 15/041,439, filed on Feb. 11, 2016, now Pat. No. 10,772,082, which is a
(Continued)

(30) Foreign Application Priority Data

Dec. 20, 2007 (EP) ..................................... 07024829

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0079* (2013.01); *H04L 1/1893* (2013.01);
(Continued)

(58) Field of Classification Search
CPC ............ H04W 72/0413; H04W 72/042; H04L 1/0079; H04L 1/1893; H04L 1/1896
See application file for complete search history.

(56) References Cited

U.S. PATENT DOCUMENTS 5,402,244 A 3/1995 Kim
5,475,863 A 12/1995 Simpson et al.
(Continued)

FOREIGN PATENT DOCUMENTS

CN 1294831 5/2001
CN 101061686 10/2007
(Continued)

OTHER PUBLICATIONS

3GPP TS 36.212 V8.0.0, "3rd Generation Partnership Project; Technical Specification Group Radio Access Network; Evolved Universal Terrestrial Radio Access (E-UTRA); Multiplexing and channel coding (Release 8)," Sep. 2007, 30 pages.
(Continued)

*Primary Examiner* — Ronald B Abelson
(74) *Attorney, Agent, or Firm* — Nixon & Vanderhye P.C.

(57) ABSTRACT

A radio terminal in a radio communication system receives a physical downlink control signal comprising a control field and a new data indicator (NDI) field and determines that a value of the NDI field is one of a first value and a second value. A physical uplink shared channel signal is generated according to both a specific transport format and a specific redundancy version. The control field is used to determine the specific transport format when the NDI field is determined to be the first value, and the control field is used to determine the specific redundancy version when the NDI field is determined to be the second value.

28 Claims, 7 Drawing Sheets

Related U.S. Application Data continuation of application No. 14/607,312, filed on Jan. 28, 2015, now Pat. No. 9,295,053, which is a continuation of application No. 13/744,244, filed on Jan. 17, 2013, now Pat. No. 8,948,117, which is a continuation of application No. 12/809,423, filed as application No. PCT/EP2008/010845 on Dec. 18, 2008, now Pat. No. 8,385,284.

(51) Int. Cl.
  *H04L 1/18* (2006.01)
  *H04L 1/16* (2006.01)

(52) U.S. Cl.
  CPC ......... *H04L 1/1896* (2013.01); *H04W 72/042* (2013.01); *H04L 1/1607* (2013.01); *H04L 1/1812* (2013.01)

(56) References Cited

U.S. PATENT DOCUMENTS

| | | |
|---|---|---|
| 5,511,082 A | 4/1996 | How et al. |
| 5,528,628 A | 6/1996 | Park et al. |
| 5,533,014 A | 7/1996 | Willars et al. |
| 5,581,575 A | 12/1996 | Zehavi et al. |
| 5,631,635 A | 5/1997 | Robertson et al. |
| 5,668,820 A | 9/1997 | Ramesh et al. |
| 5,771,224 A | 6/1998 | Seki et al. |
| 5,828,677 A | 10/1998 | Sayeed et al. |
| 5,859,840 A | 1/1999 | Tiedemann, Jr. et al. |
| 5,867,478 A | 2/1999 | Baum et al. |
| 5,883,899 A | 3/1999 | Dahlman et al. |
| 5,896,368 A | 4/1999 | Dahlman et al. |
| 5,923,650 A | 7/1999 | Chen et al. |
| 5,926,574 A | 7/1999 | Nishikawa et al. |
| 5,940,439 A | 8/1999 | Kleider et al. |
| 5,946,320 A | 8/1999 | Decker |
| 5,954,839 A | 9/1999 | Park et al. |
| 5,983,382 A | 11/1999 | Pauls |
| 5,983,384 A | 11/1999 | Ross |
| 6,005,622 A | 12/1999 | Haskell et al. |
| 6,138,260 A | 10/2000 | Ketseoglou |
| 6,148,109 A | 11/2000 | Boon et al. |
| 6,201,811 B1 | 3/2001 | Larsson et al. |
| 6,205,905 B1 | 3/2001 | Satoh et al. |
| 6,208,663 B1 | 3/2001 | Schramm et al. |
| 6,215,905 B1 | 4/2001 | Lee et al. |
| 6,233,713 B1 | 5/2001 | Van Den Berghe et al. |
| 6,271,885 B2 | 8/2001 | Sugiyama |
| 6,275,488 B1 | 8/2001 | Cudak et al. |
| 6,285,681 B1 | 9/2001 | Kolze et al. |
| 6,289,217 B1 | 9/2001 | Hamalainen et al. |
| 6,308,294 B1 | 10/2001 | Ghosh et al. |
| 6,311,306 B1 | 10/2001 | White et al. |
| 6,317,430 B1 | 11/2001 | Knisely et al. |
| 6,320,520 B1 | 11/2001 | Luby |
| 6,334,197 B1 | 12/2001 | Eroz et al. |
| 6,339,646 B1 | 1/2002 | Dahlman et al. |
| 6,359,877 B1 | 3/2002 | Rathonyi et al. |
| 6,370,669 B1 | 4/2002 | Eroz et al. |
| 6,381,727 B1 | 4/2002 | Ikeda |
| 6,397,367 B1 | 5/2002 | Park et al. |
| 6,430,722 B1 | 8/2002 | Eroz et al. |
| 6,473,442 B1 | 10/2002 | Lundsjo et al. |
| 6,473,467 B1 | 10/2002 | Wallace et al. |
| 6,516,441 B1 | 2/2003 | Kim et al. |
| 6,532,306 B1 | 3/2003 | Boon et al. |
| 6,556,625 B2 | 4/2003 | Haskell et al. |
| 6,571,019 B1 | 5/2003 | Kim et al. |
| 6,574,211 B2 | 6/2003 | Padovani et al. |
| 6,625,133 B1 | 9/2003 | Balachandran et al. |
| 6,646,578 B1 | 11/2003 | Au |
| 6,654,419 B1 | 11/2003 | Sriram et al. |
| 6,671,851 B1 | 12/2003 | Moulsley |
| 6,690,307 B2 | 2/2004 | Karczewicz |
| 6,696,993 B2 | 2/2004 | Karczewicz |
| 6,697,984 B1 | 2/2004 | Sim et al. |
| 6,701,129 B1 | 3/2004 | Hashem et al. |
| 6,704,898 B1 | 3/2004 | Furuskar et al. |
| 6,765,963 B2 | 7/2004 | Karczewicz et al. |
| 6,768,713 B1 | 7/2004 | Siala et al. |
| 6,778,558 B2 | 8/2004 | Balachandran et al. |
| 6,785,323 B1 | 8/2004 | Proctor, Jr. |
| 6,791,966 B1 | 9/2004 | Mikkola et al. |
| 6,795,584 B2 | 9/2004 | Karczewicz et al. |
| 6,856,701 B2 | 2/2005 | Karczewicz et al. |
| 6,865,233 B1 | 3/2005 | Eriksson et al. |
| 6,868,075 B1 | 3/2005 | Narvinger et al. |
| 6,895,057 B1 | 5/2005 | Balachandran et al. |
| 6,904,283 B2 | 6/2005 | Li et al. |
| 6,907,026 B2 | 6/2005 | Akiyama |
| 6,952,454 B1 | 10/2005 | Jalali et al. |
| 6,975,611 B1 | 12/2005 | Balachandran et al. |
| 7,000,173 B2 | 2/2006 | Buckley et al. |
| 7,006,848 B2 | 2/2006 | Ling et al. |
| 7,061,997 B1 | 6/2006 | Eberlein et al. |
| RE39,167 E | 7/2006 | Jo et al. |
| 7,099,387 B2 | 8/2006 | Bjontegaard et al. |
| 7,142,548 B2 | 11/2006 | Fong et al. |
| 7,171,229 B2 | 1/2007 | Moulsley et al. |
| 7,263,088 B2 | 8/2007 | Bui |
| 7,263,232 B2 | 8/2007 | Srinivasan |
| 7,283,508 B2 | 10/2007 | Choi et al. |
| 7,301,929 B2 | 11/2007 | Frederiksen et al. |
| 7,388,848 B2 | 6/2008 | Virtanen et al. |
| 7,426,201 B2 | 9/2008 | Kim et al. |
| 7,457,588 B2 | 11/2008 | Love et al. |
| 7,499,474 B2 | 3/2009 | Derryberry et al. |
| 7,593,380 B1 | 9/2009 | Ferguson et al. |
| 7,688,798 B2 | 3/2010 | Dottling et al. |
| 7,706,447 B2 | 4/2010 | Karczewicz et al. |
| 7,720,041 B2 | 5/2010 | Frederiksen et al. |
| 7,773,708 B2 | 8/2010 | Parantainen |
| 7,808,955 B2 | 10/2010 | Dottling et al. |
| 7,813,379 B2 | 10/2010 | Kim |
| 7,864,659 B2 | 1/2011 | Koo et al. |
| 7,876,848 B2 | 1/2011 | Han et al. |
| 7,885,176 B2 | 2/2011 | Pi et al. |
| 7,885,245 B2 | 2/2011 | Terry |
| 7,933,195 B2 | 4/2011 | Kim et al. |
| 7,934,137 B2 | 4/2011 | Luo et al. |
| 7,961,700 B2 | 6/2011 | Malladi et al. |
| 8,014,455 B2 | 9/2011 | Kim et al. |
| 8,073,068 B2 | 12/2011 | Kim et al. |
| 8,102,896 B2 | 1/2012 | Pajukoski et al. |
| 8,134,944 B2 | 3/2012 | Kang et al. |
| 8,175,039 B2 | 5/2012 | Heo et al. |
| 8,229,448 B2 | 7/2012 | Khan |
| 8,331,328 B2 | 12/2012 | Papasakellariou et al. |
| 8,363,606 B2 | 1/2013 | Montojo et al. |
| 8,363,624 B2 | 1/2013 | Blanz et al. |
| 8,385,284 B2 | 2/2013 | Wengerter et al. |
| 8,467,367 B2 | 6/2013 | Malladi et al. |
| 8,477,695 B2 | 7/2013 | Zhang |
| 8,489,128 B2 | 7/2013 | Lundby |
| 8,509,204 B2 | 8/2013 | Wiberg et al. |
| 8,559,457 B2 | 10/2013 | Frederiksen et al. |
| 8,576,784 B2 | 11/2013 | Lohr et al. |
| 8,619,889 B2 | 12/2013 | Ghosh et al. |
| 8,634,432 B2 | 1/2014 | Khan et al. |
| 8,645,786 B2 | 2/2014 | Michel et al. |
| 8,665,855 B2 | 3/2014 | Kwak et al. |
| 8,693,383 B2 | 4/2014 | Damnjanovic et al. |
| 8,774,106 B2 | 7/2014 | Lohr et al. |
| 8,934,848 B2 | 1/2015 | Nishio et al. |
| 8,948,117 B2 | 2/2015 | Wengerter et al. |
| 9,184,870 B2 | 11/2015 | Sampath et al. |
| 9,295,053 B2 | 3/2016 | Wengerter et al. |
| 9,370,014 B2 | 6/2016 | Tanno et al. |
| 2001/0015954 A1 | 8/2001 | Kuwabara et al. |
| 2001/0056560 A1 | 12/2001 | Khan et al. |
| 2002/0159425 A1 | 10/2002 | Uesugi et al. |
| 2002/0177447 A1 | 11/2002 | Walton et al. |
| 2003/0036403 A1 | 2/2003 | Shiu et al. |

(56) References Cited

U.S. PATENT DOCUMENTS

| | | |
|---|---|---|
| 2003/0043928 A1 | 3/2003 | Ling et al. |
| 2003/0048208 A1 | 3/2003 | Karczewicz |
| 2003/0054847 A1 | 3/2003 | Kim et al. |
| 2003/0063583 A1 | 4/2003 | Padovani et al. |
| 2003/0081850 A1 | 5/2003 | Karczewicz et al. |
| 2003/0114181 A1 | 6/2003 | Lee et al. |
| 2003/0123470 A1 | 7/2003 | Kim et al. |
| 2003/0138150 A1 | 7/2003 | Srinivasan |
| 2003/0147371 A1 | 8/2003 | Choi et al. |
| 2003/0151529 A1 | 8/2003 | Karczewicz |
| 2003/0159100 A1 | 8/2003 | Buckley et al. |
| 2003/0185181 A1 | 10/2003 | Balachandran et al. |
| 2004/0001429 A1 | 1/2004 | Ma et al. |
| 2004/0028020 A1 | 2/2004 | Frederiksen et al. |
| 2004/0037224 A1 | 2/2004 | Choi et al. |
| 2004/0047321 A1 | 3/2004 | Bui |
| 2004/0066974 A1 | 4/2004 | Karczewicz et al. |
| 2004/0141466 A1 | 7/2004 | Kim et al. |
| 2004/0146067 A1 | 7/2004 | Yi et al. |
| 2004/0213144 A1 | 10/2004 | Murakami et al. |
| 2005/0047393 A1 | 3/2005 | Liu |
| 2005/0047416 A1 | 3/2005 | Heo et al. |
| 2005/0048920 A1 | 3/2005 | Liu |
| 2005/0068990 A1 | 3/2005 | Liu |
| 2005/0128993 A1 | 6/2005 | Yu et al. |
| 2005/0186981 A1 | 8/2005 | Nishio |
| 2005/0201295 A1 | 9/2005 | Kim et al. |
| 2005/0213536 A1 | 9/2005 | Virtanen et al. |
| 2005/0249138 A1 | 11/2005 | Heo et al. |
| 2005/0249163 A1 | 11/2005 | Kim et al. |
| 2006/0018277 A1 | 1/2006 | Petrovic et al. |
| 2006/0023745 A1 | 2/2006 | Koo et al. |
| 2006/0227789 A1 | 10/2006 | Dottling et al. |
| 2006/0262871 A1 | 11/2006 | Cho et al. |
| 2007/0026808 A1 | 2/2007 | Love et al. |
| 2007/0041449 A1 | 2/2007 | Bjontegaard et al. |
| 2007/0071145 A1 | 3/2007 | Perets |
| 2007/0112972 A1 | 5/2007 | Yonge |
| 2007/0121742 A1 | 5/2007 | Tamaki et al. |
| 2007/0133579 A1 | 6/2007 | Kim |
| 2007/0135130 A1 | 6/2007 | Lee |
| 2007/0177569 A1 | 8/2007 | Lundby |
| 2007/0183380 A1 | 8/2007 | Rensburg et al. |
| 2007/0183384 A1 | 8/2007 | Kwak et al. |
| 2007/0189248 A1 | 8/2007 | Chang et al. |
| 2007/0195809 A1 | 8/2007 | Blanz et al. |
| 2007/0255994 A1 | 11/2007 | Michel et al. |
| 2008/0032630 A1 | 2/2008 | Kim et al. |
| 2008/0101275 A1 | 5/2008 | Kang et al. |
| 2008/0123618 A1 | 5/2008 | Papadopoulos |
| 2008/0200196 A1 | 8/2008 | Muharemovic et al. |
| 2008/0285512 A1 | 11/2008 | Pan et al. |
| 2008/0313521 A1 | 12/2008 | Frederiksen et al. |
| 2009/0022133 A1 | 1/2009 | Wiberg et al. |
| 2009/0034461 A1 | 2/2009 | Pelletier et al. |
| 2009/0046669 A1 | 2/2009 | Parantainen |
| 2009/0097444 A1* | 4/2009 | Lohr ............... H04W 72/14 |
| 2009/0280749 A1 | 11/2009 | Tanno et al. |
| 2010/0027477 A1 | 2/2010 | Yi et al. |
| 2010/0039994 A1 | 2/2010 | Yi et al. |
| 2013/0083753 A1 | 4/2013 | Lee et al. |

FOREIGN PATENT DOCUMENTS

| | | |
|---|---|---|
| EP | 0 752 779 | 1/1997 |
| EP | 0 827 299 | 3/1998 |
| EP | 0 913 972 | 5/1999 |
| EP | 0 978 962 | 2/2000 |
| EP | 1 170 897 | 1/2002 |
| EP | 1 180 858 | 2/2002 |
| EP | 1 072 138 | 9/2002 |
| EP | 1 265 411 | 12/2002 |
| EP | 1293059 | 3/2004 |
| EP | 1 424 869 | 6/2004 |
| EP | 1313248 | 8/2005 |
| EP | 1 575 234 | 9/2005 |
| EP | 1 631 104 | 3/2006 |
| EP | 1 643 700 | 4/2006 |
| EP | 1 646 163 | 4/2006 |
| EP | 1 481 494 | 2/2007 |
| EP | 1 464 200 | 10/2009 |
| EP | 1 442 537 | 12/2014 |
| GB | 2 373 148 | 9/2002 |
| RU | 2280327 | 7/2006 |
| RU | 2287902 | 11/2006 |
| RU | 2288541 | 11/2006 |
| WO | 98/31106 | 7/1998 |
| WO | 98/59450 | 12/1998 |
| WO | 99/05649 | 2/1999 |
| WO | 99/07076 | 2/1999 |
| WO | 99/22481 | 5/1999 |
| WO | 99/63702 | 12/1999 |
| WO | 00/19676 | 4/2000 |
| WO | 00/54430 | 9/2000 |
| WO | 02/49305 | 6/2002 |
| WO | 02/067461 | 8/2002 |
| WO | 02/078211 | 10/2002 |
| WO | 02/093782 | 11/2002 |
| WO | 03/034646 | 4/2003 |
| WO | 03/059002 | 7/2003 |
| WO | 03/071721 | 8/2003 |
| WO | 03/073644 | 9/2003 |
| WO | 03/084242 | 10/2003 |
| WO | 2004/004175 | 1/2004 |
| WO | 2004/057896 | 7/2004 |
| WO | 2004/073245 | 8/2004 |
| WO | 2005/002111 | 1/2005 |
| WO | 2005/088870 | 9/2005 |
| WO | 2007/030041 | 3/2007 |
| WO | 2008083804 | 7/2008 |

OTHER PUBLICATIONS

3GPP TS 36.321 V2.0.0, "3rd Generation Partnership Project; Technical Specification Group Radio Access Network; Evolved Universal Terrestrial Radio Access (E-UTRA); Medium Access Control (MAC) protocol specification (Release 8)," Nov. 2007, 23 pages.

Ericsson, "PDCCH contents—status from e-mail discussions," R1-073809, TSG-RAN WG1 #50, Agenda Item: 7.2.3, Athens, Greece, Aug. 20-24, 2007, 3 pages.

Translation of Russian Office Action dated May 23, 2013, for corresponding RU Application No. 2012142306/08 (068133), 6 pages.

"3rd Generation Partnership Project; Technical Specification Group Radio Access Network; Physical layer aspects for evolved Universal Terrestrial Radio Access (UTRA) (Release 7)," 3GPP TR 25.814 V7.1.0, Sep. 2006, 132 pages.

"3rd Generation Partnership Project; Technical Specification Group Radio Access Network; Multiplexing and channel coding (FOO) (Release 7)," 3GPP TS 25.212 V7.6.0, Sep. 2007, Sections 4.5 and 4.6, 29 pages.

"3rd Generation Partnership Project; Technical Specification Group Radio Access Network; High Speed Downlink Packet Access (HSDPA); Overall description; Stage 2 (Release 7)," 3GPP TS 25.308 V7.4.0, Sep. 2007, 50 pages.

NTT DoCoMo, Fujitsu, Mitsubishi Electric, NEC, Sharp, Toshiba Corporation, "Coding Scheme of L1/L2 Control Channel for E-UTRA Downlink," R1-061672, 3GPP TSG RAN WG1 LTE AdHoc, Cannes, France, Jun. 27-30, 2006, 19 pages.

NTT DoCoMo, Ericsson, Fujitsu, Mitsubishi Electric, NEC, Panasonic, Sharp, Toshiba Corporation, "Comparison between RB-level and Sub-carrier-level Distributed Transmission for Shared Data Channel in E-UTRA Downlink," R1-062089 (Original R1-061182), Agenda Item: 8.2, 3GPP TSG RAN WG1 Meeting #46, Tallinn, Estonia, Aug. 28-Sep. 1, 2006, 14 pages.

Ericsson, "MIMO HS-SCCH structure," R1-063548, Agenda Item: 7.1, 3GPP TSG WG1 #47, Riga, Latvia, Nov. 6-10, 2006, 6 pages.

Ericsson, "Notes from offline discussions on PDCCH contents," R1-073870, Agenda Item: 7-2.3, TSG-RAN WG1 #50, Athens, Greece, Aug. 20-24, 2007, 3 pages.

(56) References Cited

OTHER PUBLICATIONS

Toskala et al., "High-speed Downlink Packet Access," in Harri Holma and Antti Toskala (eds.), WCDMA For UMTS—Radio Access For Third Generation Mobile Communications, Third Edition, John Wiley & Sons, Ltd., 2004, chapters 11.1 to 11.5,pp. 307-319 (25 pages).
Chinese Office Action dated Aug. 23, 2012, issued in corresponding Chinese Application No. 200880125167.3, 8 pages.
International Search Report relating to International Patent Application No. PCT/EP2008/010845, dated May 29, 2009, 5 pages.
European Search Report relating to European Patent Application No. 07 02 4829, dated Jul. 24, 2008, 4 pages.
Korean Office Action dated Jun. 3, 2015 in KR 10-2015-7004370 and English translation, 4 pages.
Chinese Office Action dated Aug. 5, 2015 in CN 201310132703.5 and English translation, 12 pages.
Korean Notice of Preliminary Rejection dated May 20, 2016 issued in KR 10-2016-7005176 and English translation, 6 pages.
NTT DoCoMo et al., 3GPP TSG RAN WG1 Meeting #47, "Coding Scheme of L1/L2 Control Channel for E-UTRA Downlink" R1-063322, Riga, Latvia, Nov. 6-10, 2006, 20 pages.
Australian Examination Report dated Jun. 21, 2016 in AU 2015231985, 4 pages.
Korean Office Action dated Mar. 8, 2017 in KR 10-2017-7001703 and English translation, 4 pages.
Defendant Huawei's Preliminary Invalidity Contentions submitted and served Sep. 13, 2017, 192 pages.
Extended European Search Report dated Oct. 23, 2017 in EP 17184071.3, 8 pages.
3GPP TS 25.101 V1.0.0 (Apr. 1999), $3^{rd}$ Generation Partnership Project (3GPP) Technical Specification Group (TSG) RAN WG4, UTRA (UE) FDD; Radio transmission and Reception, Apr. 1999, 40 pages.
3GPP TS 25.101 V2.0.0 (Jun. 1999), $3^{rd}$ Generation Partnership Project (3GPP) Technical Specification Group (TSG) RAN WG4, UE Radio transmission and Reception (FDD), Jun. 1999, 57 pages.
3GPP TS 25.101 V3.0.0 (Oct. 1999), $3^{rd}$ Generation Partnership Project (3GPP) Technical Specification Group (TSG) RAN WG4, UE Radio transmission and Reception (FDD), Oct. 1999, 66 pages.
3GPP TS 25.211 V2.1.0 (Jun. 1999), $3^{rd}$ Generation Partnership Project (3GPP); Technical Specification Group (TSG) Radio Access Network (RAN); Working Group 1 (WG1); Physical channels and mapping of transport channels onto physical channels (FDD), Jun. 1999, 38 pages.
3GPP TS 25.211 V3.0.0 (Oct. 1999), $3^{rd}$ Generation Partnership Project (3GPP); Technical Specification Group Radio Access Network; Physical channels and mapping of transport channels onto physical channels (FDD), Oct. 1999, 33 pages.
3GPP TS 25.212 V1.0.0 (Apr. 23, 1999), $3^{rd}$ Generation Partnership Project (3GPP); Technical Specification Group (TSG) Radio Access Network (RAN); Working Group 1 (WG1); Multiplexing and channel coding (FDD), Apr. 1999, 38 pages.
3GPP TS 25.212 V2.0.0 (Jun. 23, 1999), $3^{rd}$ Generation Partnership Project (3GPP); Technical Specification Group (TSG) Radio Access Network (RAN); Working Group 1 (WG1); Multiplexing and channel coding (FDD), Jun. 1999, 38 pages.
3GPP TS 25 212 V3.0.00 (Oct. 13, 1999), $3^{rd}$ Generation Partnership Project (3GPP); Technical Specification Group Radio Access Network Multiplexing and channel coding (FDD), Oct. 1999, 53 pages.
3GPP TS 25.213 V2.0.00 (Apr. 1999), $3^{rd}$ Generation Partnership Project (3GPP); Technical Specification Group (TSG) Radio Access Network (RAN); Working Group 1 (WG1); Spreading and modulation (FDD), Apr. 1999, 26 pages.
3GPP TS 25.213 V2.1.0 (Jun. 1999), $3^{rd}$ Generation Partnership Project (3GPP); Technical Specification Group (TSG) Radio Access Network (RAN); Working Group 1 (WG1); Spreading and modulation (FDD), Jun. 1999, 26 pages.
3GPP TS 25.213 V3.0.0 (Oct. 1999), $3^{rd}$ Generation Partnership Project (3GPP); Technical Specification Group Radio Access Network Spreading and modulation (FDD) Oct. 1999, 27 pages.
U.S. Appl. No. 60/072,368, filed Jan. 23, 1998, 32 pages.
U.S. Appl. No. 60/074,932, filed Feb. 17, 1998, 74 pages.
U.S. Appl. No. 60/075,742, filed Feb. 23, 1998, 81 pages.
U.S. Appl. No. 60/076,464, filed Mar. 2, 1998, 98 pages.
Akira Shiozaki et al. / IEEE, "A Hybrid ARQ Scheme with Adaptive Forward Error Correction for Satellite Communications" *IEEE Transactions on Communications*, vol. 39, No. 4, Apr. 1991, pp. 482-484.
P. Decker / IEEE, "An Adaptive Type-II hybrid ARQ/FEC Protocol suitable for GSM" Jun. 1994, pp. 330-333.
Mustafa Eroz, et al. / IEEE, "A Multiple Trellis-Coded Hybrid-ARQ Scheme for Land Mobile Communication Channels" Nov. 1995, pp. 496-500.
Sorour Falahati, et al., "Hybrid Type II ARQ Schemes with Adaptive Modulation Systems for Wireless Channels" 1999, 5 pages.
Peter Jung, et al. / IEEE, "A pragmatic approach to rate compatible punctured Turbo-Codes for mobile radio applications" Jun. 23-27, 1997, 20 pages.
Samir Kallel / IEEE, "Complementary Punctured Convolutional (CPC) Codes and Their Applications" IEEE Transactions on Communications, vol. 43, No. 6, Jun. 1995, pp. 2005-2009.
Shu Lin, et al. / IEEE, "Automatic-Repeat-Request Error-Control Schemes" IEEE Communications Magazine, vol. 22, No. 12, Dec. 1984, pp. 5-17.
Hang Liu, et al. / IEEE, "Performance of H.263 Video Transmission over Wireless Channels Using Hybrid ARQ" IEEE Journal on Selected Areas in Communications, vol. 15, No. 9, Dec. 1997, pp. 1775-1786.
H. Lou, et al. / IEEE, "Performance of Punctured Channel Codes With ARQ for Multimedia Transmission in Rayleigh Fading Channels" Apr. 28-May 1, 1996, pp. 282-286.
Siemens AG, R1-99178, TSG-RAN Working Group 1 meeting #3, Nynashamn, Mar. 1999, 5 pages.
Siemens, R1-99356, TSG-RAN Working Group 1 meeting #4, Shin-Yokohama, Japan, Apr. 1999, 7 pages.
Samir Kallel / IEEE, "Generalized Type II Hybrid ARQ Scheme Using Punctured Convolutional Coding" IEEE Transactions on Communications, vol. 38, No. 11, Nov. 1990, pp. 1938-1946.
Samir Kallel / IEEE, "Analysis of Memory and Incremental Redundancy ARQ Schemes Over a Nonstationary Channel" IEEE Transactions on Communications, vol. 40, No. 9, Sep. 1992, pp. 1474-1480.
U.S. Appl. No. 60/156,431, filed Sep. 28, 1999 (provisional to U.S. Pat. No. 6,868,075), 9 pages.
U.S. Appl. No. 60/166,078, filed Nov. 17, 1999 (provisional to U.S. Pat. No. 6,308,294), 19 pages.
U.S. Appl. No. 60/105,372, filed Oct. 23, 1998, 19 pages.
Kaizhen Wu, et al. / IEEE, "A Hybrid ARQ Scheme Using Multiple Shortened Cyclic Codes" Nov. 29-Dec. 2, 1982, 7 pages.
Yu-Ming Wang, et al. / IEEE, "A Modified Selective-Repeat Type-II Hybrid ARQ System and Its Performance Analysis" IEEE Transactions on Communications, vol. COM-31, No. 5, May 1983, pp. 593-608.
Zulfiquar Sayeed, et al. / IEEE, "Adaptive Hybrid ARQ Schemes For Slow Fading Channels" Proceedings of the 1996 Conference on information Science and Systems, vol. I, 1996, 7 pages.
Qingqing Zhang, et al. / IEEE, "Hybrid ARQ with Selective Combining for Fading Channels" IEEE Journal on Selected Areas in Communications, vol. 17, No. 5, May 1999, pp. 867-880.
Scott L. McCulley, Design and Implementation of a Practical Flex™ Paging Decoder, Thesis, Oct. 24, 1997, 74 pages.
CSR, Communications Standards Review, vol. 12, No. 48, "Report of JVT and VCEG: Q6/16 and ISO/IEC JTC1/SC29/WG 11 Meeting, Dec. 4-6, 2001, Pattaya, Thailand", Dec. 26, 2001, pp. 1-18.
CSR, Communications Standards Review, vol. 13, No. 5 Revised, "Report of the Plenary Sessions of the ITU-T Study Group 16 Meetings, Feb. 5-15, 2002, Geneva, Switzerland" Mar. 13, 2002, pp. 1-16.
CSR, Communications Standards Review, vol. 13, No. 3, "Report of Joint Video Team (JVT) Meeting #2, ISO/IEC JTC1/SC29/WG 11

(56) References Cited

OTHER PUBLICATIONS and ITU-T SG16 Q6 (VCEG), Jan. 29-Feb. 1, 2002, Geneva, Switzerland" Feb. 19, 2002, pp. 1-38.
CSR, Communications Standards Review, vol. 13, No. 25, "Report of Joint Video Team (JVT) Meeting #3, ISO/IEC JTC1/SC29/WG 11 and ITU-T SG16 Q6 (VCEG), May 6-10, 2002, Fairfax, Virginia" Jul. 24, 2002, pp. 1-52.
Patent Statement and Licensing Declaration for a common text or twin text ITU-T Recommendation ISO/IEC International Standard, Jun. 15, 2002, signature date Oct. 2002, 3 pages.
Draft ISO/IEC 14496-10 : 2002 (E), Joint Video Team (JVT) of ISO/IEC MPEG & ITU-T VCEG, Document JVT-F100, $6^{th}$ Meeting, Awaji, Island, JP, Dec. 5-13, 2002, 242 pages.
Preliminary Invitation to the Third JVT Meeting, Fairfax, Virginia, USA, May 6-10, 2002, to The Joint Video Team (JVT) of the ITU-T Q.6/16 Video Coding Experts Group (VCEG) and the ISO/IEC JTC1/SC29/WG11 Moving Picture Experts Group (MPEG), Apr. 2, 2002, 6 pages.
JVT-C000r0, May 2002, 1 page.
JVT-C000r1, May 2002, 3 pages.
JVT-C000r2, May 3, 2002, 4 pages.
JVT-C001d0, JVT Meeting Resolutions, May 2002, 5 pages.
JVT-C001d1, JVT Meeting Resolutions, May 2002, 8 pages.
JVT-C001d2, JVT Meeting Resolutions, May 2002, 8 pages.
JVT-C001d3, (Draft) Report of Fairfax Meeting, $3^{rd}$ Meeting, Fairfax, Virginia, USA, May 6-10, 2002, 48 pages.
JVT-C002d5, JVT (of ISO/IEC MPEG and ITU-T Q.6/16 VCEG) $2^{nd}$ Meeting Report, Jan. 29-Feb. 1, 2002, 51 pages.
JVT-C007, AHG Report: Deblocking, Joint Video Team (JVT) of ISO/IEC MPEG & ITU-T VCEG $3^{rd}$ Meeting, Fairfax, Virginia, USA May 6-10, 2002, 2 pages.
JVT-C008, AHG Report: VLC, Joint Video Team (JVT) of ISO/IEC MPEG & ITU-T VCEG $3^{rd}$ Meeting, Fairfax, Virginia, USA May 6-10, 2002, 2 pages.
JVT-C009, CABAC Ad Hoc Group Report, Joint Video Team (JVT) of ISO/IEC MPEG & ITU-T VCEG $3^{rd}$ Meeting, Fairfax, Virginia, USA May 6-10, 2002, 3 pages.
JVT-C028, Context-adaptive VLC (CVLC) coding of efficients, Joint Video Team (JVT) of ISO/IEC MPEG & ITU-T VCEG $3^{rd}$ Meeting, Fairfax, Virginia, USA May 6-10, 2002, Date saved May 1, 2002, 11 pages.
JVT-C028, Context-adaptive VLC (CVLC) coding of efficients, Joint Video Team (JVT) of ISO/IEC MPEG & ITU-T VCEG $3^{rd}$ Meeting, Fairfax, Virginia, USA May 6-10, 2002, Date saved May 3, 2002, 11 pages.
JVT-C029, Low-Complexity Arithmetic Coding for CABAC, Joint Video Team (JVT) of ISO/IEC MPEG & ITU-T VCEG $3^{rd}$ Meeting, Fairfax, Virginia, USA May 6-10, 2002, 13 pages.
JVT-C031, Improvements on RUN and LEVEL information coding in CABAC, Joint Video Team (JVT) of ISO/IEC MPEG & ITU-T VCEG $3^{rd}$ Meeting, Fairfax, Virginia, USA May 6-10, 2002, 8 pages.
JVT-C038, Bounding the complexity of arithmetic decoding, Joint Video Team (JVT) of ISO/IEC MPEG & ITU-T VCEG $3^{rd}$ Meeting, Fairfax, Virginia, USA May 6-10, 2002, 13 pages.
JVT-C039, Editor's latest draft of JVT WD2 design, Joint Video Team (JVT) of ISO/IEC MPEG & ITU-T VCEG $3^{rd}$ Meeting, Fairfax, Virginia, USA May 6-10, 2002, 122 pages.
JVT-C060, Improved CABAC, Joint Video Team (JVT) of ISO/IEC MPEG & ITU-T VCEG $3^{rd}$ Meeting, Fairfax, Virginia, USA May 6-10, 2002, 13 pages.
JVT-C085, IPR WG establishment for JVT, Joint Video Team (JVT) of ISO/IEC MPEG & ITU-T VCEG $3^{rd}$ Meeting, Fairfax, Virginia, USA May 6-10, 2002, 1 page.
JVT-C086, Improving coefficients coding for Intra Picture, Joint Video Team (JVT) of ISO/IEC MPEG & ITU-T VCEG $3^{rd}$ Meeting, Fairfax, Virginia, USA May 6-10, 2002, 6 pages.
JVT-C088, Adaptive Transform Coefficient Coding, Joint Video Team (JVT) of ISO/IEC MPEG & ITU-T VCEG $3^{rd}$ Meeting, Fairfax, Virginia, USA May 6-10, 2002, 6 pages.
JVT-C088, A New Syntax for Error Resilient Transmission of CABAC Stream, Joint Video Team (JVT) of ISO/IEC MPEG & ITU-T VCEG $3^{rd}$ Meeting, Fairfax, Virginia, USA May 6-10, 2002, 9 pages.
JVT-C100, Improved Terminology for CABAC Section of WD, Joint Video Team (JVT) of ISO/IEC MPEG & ITU-T VCEG $3^{rd}$ Meeting, Fairfax, Virginia, USA May 6-10, 2002, 10 pages.
JVT-C110, JVT IPR Status Report, Joint Video Team (JVT) of ISO/IEC MPEG & ITU-T VCEG $3^{rd}$ Meeting, Fairfax, Virginia, USA May 6-10, 2002, 8 pages.
JVT-C123, Licensing issues on JTV, Joint Video Team (JVT) of ISO/IEC MPEG & ITU-T VCEG $3^{rd}$ Meeting, Fairfax, Virginia, USA May 6-10, 2002, 1 page.
JVT-C124, Information on JVT patents, Joint Video Team (JVT) of ISO/IEC MPEG & ITU-T VCEG $3^{rd}$ Meeting, Fairfax, Virginia, USA May 6-10, 2002, 1 page.
JVT-C134, Verification of Low Complexity Arithmetic Coding Engine for CABAC, Joint Video Team (JVT) of ISO/IEC MPEG & ITU-T VCEG $3^{rd}$ Meeting, Fairfax, Virginia, USA May 6-10, 2002, 4 pages.
JVT-C145, Verification results for adaptive coding of transform coefficients (JVT-C088), Joint Video Team (JVT) of ISO/IEC MPEG & ITU-T VCEG $3^{rd}$ Meeting, Fairfax, Virginia, USA May 6-10, 2002, 3 pages.
JVT-C149, Licensing issues on JTV, Joint Video Team (JVT) of ISO/IEC MPEG & ITU-T VCEG $3^{rd}$ Meeting, Fairfax, Virginia, USA May 6-10, 2002, 1 page.
JVT-C150, Support for JVT Royalty Free Baseline, Joint Video Team (JVT) of ISO/IEC MPEG & ITU-T VCEG $3^{rd}$ Meeting, Fairfax, Virginia, USA May 6-10, 2002, 2 pages.
JVT-C156, VCEG Requirements for AVC Codec, ISO/IEC JTC1/SC29/WGII/N4672, Mar. 2002, Jeju, Korea, 6 pages.
JVT-C167, Joint Committee Draft (CD), Joint Video Team (JVT) of ISO/IEC MPEG & ITU-T VCEG $3^{rd}$ Meeting, Fairfax, Virginia, USA May 6-10, 2002, 141 pages.
JVT-C-Agenda_r0, JVT-C008, 19 pages.
JVT-C-Agenda_r3. JVT-C008, 34 pages.
Preliminary Invitation to the Third JVT Meeting, Fairfax, Virginia, USA, May 6-10, 2002, to The Joint Video Team (JVT) of The ITU-T Q.6/16 Video Coding Experts Group (VCEG) and the ISO/IEC JTC1/SC29/WG11 Moving Picture Experts Group (MPEG), Version: Apr. 2, 2002, 6 pages.
JVT-C060, Improved CABAC, Joint Video Team (JVT) of ISO/IEC MPEG & ITU-T VCEG $3^{rd}$ Meeting, Fairfax, Virginia, USA May 6-10, 2002, 12 pages.
JVT-C061, Fast Arithmetic Coding for CABAC, Joint Video Team (JVT) of ISO/IEC MPEG & ITU-T VCEG $3^{rd}$ Meeting, Fairfax, Virginia, USA May 6-10, 2002, 14 pages.
JVT-C133, Verification of Improved CABAC, Joint Video Team (JVT) of ISO/IEC MPEG & ITU-T VCEG $3^{rd}$ Meeting, Fairfax, Virginia, USA May 6-10, 2002, 4 pages.
JVT-B00, List of Documents of $2^{nd}$ JVT Meeting (Geneva, Jan. 29-Feb. 1, 2001), Joint Video Team (JVT) of ISO/IEC MPEG & ITU-T VCEG, 2 pages.
JVT-B001 draft 1, JVT (of ISO/IEC MPEG and ITU-T Q.6/16 VCEG) $2^{nd}$ Meeting Report, Geneva, CH, Jan. 29-Feb. 1, 2002, 31 pages.
JVT-B001 draft 2, JVT (of ISO/IEC MPEG and ITU-T Q.6/16 VCEG) $2^{nd}$ Meeting Report, Geneva, CH, Jan. 29-Feb. 1, 2002, 50 pages.
JVT-B001 draft 3, JVT (of ISO/IEC MPEG and ITU-T Q.6/16 VCEG) $2^{nd}$ Meeting Report, Geneva, CH, Jan. 29-Feb. 1, 2002, 51 pages.
JVT-B001 draft 4, JVT (of ISO/IEC MPEG and ITU-T Q.6/16 VCEG) $2^{nd}$ Meeting Report, Geneva, CH, Jan. 29-Feb. 1, 2002, 51 pages.
JVT-B001 draft 5, JVT (of ISO/IEC MPEG and ITU-T Q.6/16 VCEG) $2^{nd}$ Meeting Report, Geneva, CH, Jan. 29-Feb. 1, 2002, 51 pages.
JVT-B005, Ad Hoc Report on JVT Project, Joint Video Team JVT of ISO/IEC MPEG and ITU-T VCEG, $2^{nd}$ Meeting, Geneva, CH, Jan. 29-Feb. 1, 2002, 3 pages.

(56) References Cited

OTHER PUBLICATIONS

JVT-B015, CABAC Ad Hoc Group Report, Joint Video Team JVT of ISO/IEC MPEG and ITU-T VCEG, $2^{nd}$ Meeting, Geneva, CH, Jan. 29-Feb. 1, 2002, 6 pages.
JVT-B018, AHG Report: Adaptive Motion Interpolation, Joint Video Team JVT of ISO/IEC MPEG and ITU-T VCEG, $2^{nd}$ Meeting, Geneva, CH, Jan. 29-Feb. 1, 2002, 2 pages.
JVT-B029, Reduced Complexity VLC, Joint Video Team JVT of ISO/IEC MPEG and ITU-T VCEG, $2^{nd}$ Meeting, Geneva, CH, Jan. 29-Feb. 1, 2002, 6 pages.
JVT-B033, Low-Complexity Arithmetic Coding Implementation, Joint Video Team JVT of ISO/IEC MPEG and ITU-T VCEG, $2^{nd}$ Meeting, Geneva, CH, Jan. 29-Feb. 1, 2002, 13 pages.
JVT-B034, Enhanced variable-length coding, Joint Video Team JVT of ISO/IEC MPEG and ITU-T VCEG, $2^{nd}$ Meeting, Geneva, CH, Jan. 29-Feb. 1, 2002, 9 pages.
JVT-B034r1, Enhanced variable-length coding, Joint Video Team JVT of ISO/IEC MPEG and ITU-T VCEG, $2^{nd}$ Meeting, Geneva, CH, Jan. 29-Feb. 1, 2002, 12 pages.
JVT-B036, Low-Complexity Arithmetic Codec Engine, Joint Video Team JVT of ISO/IEC MPEG and ITU-T VCEG, $2^{nd}$ Meeting, Geneva, CH, Jan. 29-Feb. 1, 2002, 10 pages.
JVT-B045, Improved low complexity entropy coding for transform coefficients, Joint Video Team JVT of ISO/IEC MPEG and ITU-T VCEG, $2^{nd}$ Meeting, Geneva, CH, Jan. 29-Feb. 1, 2002, 11 pages.
JVT-B047, Removal of EOB Coding Redundancy, Joint Video Team JVT of ISO/IEC MPEG and ITU-T VCEG, $2^{nd}$ Meeting, Geneva, CH, Jan. 29-Feb. 1, 2002, 7 pages.
JVT-B056, Proposal of Improved 2D-VLC coding for High-Bitrate, Joint Video Team JVT of ISO/IEC MPEG and ITU-T VCEG, $2^{nd}$ Meeting, Geneva, CH, Jan. 29-Feb. 1, 2002, 11 pages.
JVT-B062, Improved Entropy Coding with Codeword Re-Association, Joint Video Team JVT of ISO/IEC MPEG and ITU-T VCEG, $2^{nd}$ Meeting, Geneva, CH, Jan. 29-Feb. 1, 2002, 12 pages.
JVT-B062, Improved Entropy Coding with Codeword Re-Association, Joint Video Team JVT of ISO/IEC MPEG and ITU-T VCEG, $2^{nd}$ Meeting, Geneva, CH, Jan. 29-Feb. 1, 2002, 9 pages.
JVT-B064, Additional Results related to the CABAC AHG, Joint Video Team JVT of ISO/IEC MPEG and ITU-T VCEG, $2^{nd}$ Meeting, Geneva, CH, Jan. 29-Feb. 1, 2002, 2 pages.
JVT-B072, VLC coefficients coding for high bitrate, Joint Video Team JVT of ISO/IEC MPEG and ITU-T VCEG, $2^{nd}$ Meeting, Geneva, CH, Jan. 29-Feb. 1, 2002, 2 pages.
JVT-B072, VLC coefficients coding for high bitrate, Joint Video Team JVT of ISO/IEC MPEG and ITU-T VCEG, $2^{nd}$ Meeting, Geneva, CH, Jan. 29-Feb. 1, 2002, 6 pages.
JVT-B074r1, An improved variable length coding Joint Video Team JVT of ISO/IEC MPEG and ITU-T VCEG, $2^{nd}$ Meeting, Geneva, CH, Jan. 29-Feb. 1, 2002, 8 pages.
JVT-B074, "An improved variable length coding" Joint Video Team JVT of ISO/IEC MPEG and ITU-T VCEG, $2^{nd}$ Meeting, Geneva, CH, Jan. 29-Feb. 1, 2002, 5 pages.
JVT-B081, Adaptive Use of Double Scan for Intra Performance Joint Video Team JVT of ISO/IEC MPEG and ITU-T VCEG, $2^{nd}$ Meeting, Geneva, CH, Jan. 29-Feb. 1, 2002, 7 pages.
JVT-B091, Proposed Requirements on CABAC, Joint Video Team JVT of ISO/IEC MPEG and ITU-T VCEG, $2^{nd}$ Meeting, Geneva, CH, Jan. 29-Feb. 1, 2002, 6 pages.
JVT-B091r1, Proposed Requirements on CABAC, Joint Video Team JVT of ISO/IEC MPEG and ITU-T VCEG, $2^{nd}$ Meeting, Geneva, CH, Jan. 29-Feb. 1, 2002, 5 pages.
JVT-B093, Experiment Results of the Improved 2D-VLC Proposal, Joint Video Team JVT of ISO/IEC MPEG and ITU-T VCEG, $2^{nd}$ Meeting, Geneva, CH, Jan. 29-Feb. 1, 2002, 13 pages.
JVT-B093r1, Experiment Results of the Improved 2D-VLC Proposal, Joint Video Team JVT of ISO/IEC MPEG and ITU-T VCEG, $2^{nd}$ Meeting, Geneva, CH, Jan. 29-Feb. 1, 2002, 12 pages.
JVT-B099, Reversibility of code, Joint Video Team JVT of ISO/IEC MPEG and ITU-T VCEG, $2^{nd}$ Meeting, Geneva, CH, Jan. 29-Feb. 1, 2002, 3 pages.
JVT-B100, Performance of CABAC for Interlaced Video, Joint Video Team JVT of ISO/IEC MPEG and ITU-T VCEG, $2^{nd}$ Meeting, Geneva, CH, Jan. 29-Feb. 1, 2002, 8 pages.
JVT-B101, New Results on Improved CABAC, Joint Video Team JVT of ISO/IEC MPEG and ITU-T VCEG, $2^{nd}$ Meeting, Geneva, CH, Jan. 29-Feb. 1, 2002, 11 pages.
JVT-B101r1, New Results on Improved CABAC, Joint Video Team JVT of ISO/IEC MPEG and ITU-T VCEG, $2^{nd}$ Meeting, Geneva, CH, Jan. 29-Feb. 1, 2002, 11 pages.
JVT-B105, Improved Context Adaptive Binary Arithmetic Coder, Joint Video Team JVT of ISO/IEC MPEG and ITU-T VCEG, $2^{nd}$ Meeting, Geneva, CH, Jan. 29-Feb. 1, 2002, 8 pages.
JVT-B118r2, Wording Draft No. 2, Revision 2 (WD-2), Joint Video Team JVT of ISO/IEC MPEG and ITU-T VCEG, Geneva, Switzerland, Jan. 29-Feb. 1, 2002, 106 pages.
JVT-B-TD-00 (JVT-B-TD00r1.doc), Invitation to the Second JVT Meeting Geneva, Switzerland, Jan. 29-Feb. 1, 2002 to The Joint Video Team (JVT) of the ITU-T Q.6/16 Video Coding Experts Group (VCEG) and the ISO/IEC JTC1/SC29/WG22 Moving Picture Experts Group (MPEG), Version: Jan, 9, 2002, 4 pages.
JVT-B-TD-00 (JVT-B-TD00r1.doc), Invitation to the Second JVT Meeting Geneva, Switzerland, Jan. 29-Feb. 1, 2002 to The Joint Video Team (JVT) of the ITU-T Q.6/16 Video Coding Experts Group (VCEG) and the ISO/IEC JTC1/SC29/WG22 Moving Picture Experts Group (MPEG), Version: Jan. 24, 2002, 4 pages.
JVT document untitled with a List of JVT Documents, 11 pages.
JVT document titled Administrative Issues with a List of JVT Documents, 23 pages.
JVT document titled Administrative Issues with a List of JVT Documents, 31 pages.
Agenda, JVT-1, JVT-2, Jul. 22, 2002, 1 page.
Agenda, JVT-1, JVT-2, JVT-3, Jul. 22-23, 2002, 3 pages.
Agenda with notes draft 1 JVT, Jul. 2002, 10 pages.
Agenda with notes draft 2 JVT, Jul. 2002, 14 pages.
Agenda with notes draft 3 JVT, Jul. 2002, 33 pages.
Agenda with notes draft 5 JVT, Jul. 2002, 35 pages.
Agenda with notes draft 7 JVT, Jul. 2002, 37 pages.
Agenda with notes draft 8 JVT, Jul. 2002, 37 pages.
JVT-D012, CABAC Ad Hoc Group Report, Joint Video Team (JVT) of ISO/IEC MPEG & ITU-T VCEG, $4^{th}$ meeting, Klagenfurt, Austria, Jul. 22-26, 2002, 1 page.
JVT-D019r1, Proposed Editorial Changes and Cleanup of CABAC, Joint Video Team (JVT) of ISO/IEC MPEG & ITU-T VCEG, $4^{th}$ meeting, Klagenfurt, Austria, Jul. 22-26, 2002, 10 pages.
JVT-D019r2, Proposed Editorial Changes and Cleanup of CABAC, Joint Video Team (JVT) of ISO/IEC MPEG & ITU-T VCEG, $4^{th}$ meeting, Klagenfurt, Austria, Jul. 22-26, 2002, 10 pages.
JVT-D019r3, Proposed Editorial Changes and Cleanup of CABAC, Joint Video Team (JVT) of ISO/IEC MPEG & ITU-T VCEG, $4^{th}$ meeting, Klagenfurt, Austria, Jul. 22-26, 2002, 10 pages.
JVT-D020d0, CABAC and Slices, Joint Video Team (JVT) of ISO/IEC MPEG & ITU-T VCEG, $4^{th}$ meeting, Klagenfurt, Austria, Jul. 22-26, 2002, 17 pages.
JVT-D020r1, CABAC and Slices, Joint Video Team (JVT) of ISO/IEC MPEG & ITU-T VCEG, $4^{th}$ meeting, Klagenfurt, Austria, Jul. 22-26, 2002, 17 pages.
JVT-D020r1-L doc, 7 pages.
JVT-D035, IPR matters on JTV, Joint Video Team (JVT) of ISO/IEC MPEG & ITU-T VCEG, $4^{th}$ meeting, Klagenfurt, Austria, Jul. 22-26, 2002, 2 pages.
JVT-D036, Proposed updates to CAVLC, Joint Video Team (JVT) of ISO/IEC MPEG & ITU-T VCEG, $4^{th}$ meeting, Klagenfurt, Austria, Jul. 22-26, 2002, 11 pages.
JVT-D077, Support for JVT Royalty Free Baseline, Joint Video Team (JVT) of ISO/IEC MPEG & ITU-T VCEG, $4^{th}$ meeting, Klagenfurt, Austria, Jul. 22-26, 2002, 2 pages.
JVT-D083, Structured VLC based on Golomb code for CAVLC, Joint Video Team (JVT) of ISO/IEC MPEG & ITU-T VCEG, $4^{th}$ meeting, Klagenfurt, Austria, Jul. 22-26, 2002, 13 pages.
JVT-D088, Verification for JVT-C038 (Bounding Arithmetic Coding Complexity), Joint Video Team (JVT) of ISO/IEC MPEG & ITU-T VCEG, $4^{th}$ meeting, Klagenfurt, Austria, Jul. 22-26, 2002, 2 pages.

(56) References Cited

OTHER PUBLICATIONS

JVT-D105, Cross-verification results for CAVLC, Joint Video Team (JVT) of ISO/IEC MPEG & ITU-T VCEG, 4$^{th}$ meeting, Klagenfurt, Austria, Jul. 22-26, 2002, 1 page.
JVT-D 114, Additional Results on C038, Joint Video Team (JVT) of ISO/IEC MPEG & ITU-T VCEG, 4$^{th}$ meeting, Klagenfurt, Austria, Jul. 22-26, 2002, 6 pages.
JVT-D129, JVT IPR Status Report, Joint Video Team (JVT) of ISO/IEC MPEG & ITU-T VCEG, 4$^{th}$ meeting, Klagenfurt, Austria, Jul. 22-26, 2002, 5 pages.
JVT-D017 draft 0 (D019), Editor's Proposed Modifications to Joint Committee Draft (CD) of Joint Video Specification (ITU-T Rec. H.264 ISO/IEC 14496-10 AVC) relative to JVT-D015d5, Joint Video Team (JVT) of ISO/IEC MPEG & ITU-T VCEG, 4$^{th}$ meeting, Klagenfurt, Austria, Jul. 22-26, 2002, 138 pages.
JVT-D019, Proposed Editorial Changes and Cleanup of CABAC, Joint Video Team (JVT) of ISO/IEC MPEG & ITU-T VCEG, 4$^{th}$ meeting, Klagenfurt, Austria, Jul. 22-26, 2002, 9 pages.
JVT-D021, CABAC and ABT, Joint Video Team (JVT) of ISO/IEC MPEG & ITU-T VCEG, 4$^{th}$ meeting, Klagenfurt, Austria, Jul. 22-26, 2002, 13 pages.
JVT-D034, Complexity Reduction for CAVLC, Joint Video Team (JVT) of ISO/IEC MPEG & ITU-T VCEG, 4$^{th}$ meeting, Klagenfurt, Austria, Jul. 22-26, 2002, 16 pages.
JVT-D034r1, Complexity Reduction for CAVLC, Joint Video Team (JVT) of ISO/IEC MPEG & ITU-T VCEG, 4$^{th}$ meeting, Klagenfurt, Austria, Jul. 22-26, 2002, 16 pages.
JVT-A004 draft 0, JVT and VCEG Pattaya 1$^{st}$ Meeting Draft Report, 15 pages.
JVT-A005 draft 1, JVT 1$^{st}$ Meeting and VCEG 15$^{th}$ Meeting Draft Report, 18 pages.
Summary Report of 1$^{st}$ JVT Meeting by Gary Sullivan, JVT Chair, Pattaya Meeting, Dec. 7, 2001, 7 pages.
VCEG-N-88 draft 1, Meeting Report of the 14$^{th}$ VCEG Meeting, Sep. 24-27, 2001, ITU—Telecommunications Standardization Sector Study Group 16 Question 6, Video Coding Experts Group (VCEG), 14$^{th}$ Meeting, Santa Barbara, CA, USA, Sep. 24-27, 2001, 53 pages.
VCEG-O18, Improved CABAC, ITU—Telecommunications Standardization Sector Study Group 16 Question 6, Video Coding Experts Group (VCEG), 15$^{th}$ Meeting, Pattaya, Thailand, Dec. 4-6, 2001, 6 pages.
VCEG-O18r1, Improved CABAC, ITU—Telecommunications Standardization Sector Study Group 16 Question 6, Video Coding Experts Group (VCEG), 15$^{th}$ Meeting, Pattaya, Thailand, Dec. 4-6, 2001, 9 pages.
VCEG-O23, Improvements of CABAC in Inter-frame Coding ITU—Telecommunications Standardization Sector Study Group 16 Question 6, Video Coding Experts Group (VCEG), 15$^{th}$ Meeting, Pattaya, Thailand, Dec. 4-6, 2001, 8 pages.
VCEG-O24, Improvements on CABAC, ITU—Telecommunications Standardization Sector Study Group 16 Question 6, Video Coding Experts Group (VCEG), 15$^{th}$ Meeting, Pattaya, Thailand, Dec. 4-6, 2001, 4 pages.
VCEG-O24r1, Improvements on CABAC, ITU—Telecommunications Standardization Sector Study Group 16 Question 6, Video Coding Experts Group (VCEG), 15$^{th}$ Meeting, Pattaya, Thailand, Dec. 4-6, 2001, 6 pages.
VCEG-O24r2, Improvements on CABAC, ITU—Telecommunications Standardization Sector Study Group 16 Question 6, Video Coding Experts Group (VCEG), 15$^{th}$ Meeting, Pattaya, Thailand, Dec. 4-6, 2001, 6 pages.
VCEG-O27, Improved 2D-VLC coding for High-Bitrate, ITU—Telecommunications Standardization Sector Study Group 16 Question 6, Video Coding Experts Group (VCEG), 15$^{th}$ Meeting, Pattaya, Thailand, Dec. 4-6, 2001, 9 pages.
VCEG-O27r1, Improved 2D-VLC coding for High-Bitrate, ITU—Telecommunications Standardization Sector Study Group 16 Question 6, Video Coding Experts Group (VCEG), 15$^{th}$ Meeting, Pattaya, Thailand, Dec. 4-6, 2001, 12 pages.
VCEG-O34, Enhanced coding of coefficients, ITU—Telecommunications Standardization Sector Study Group 16 Question 6, Video Coding Experts Group (VCEG), 15$^{th}$ Meeting, Pattaya, Thailand, Dec. 4-6, 2001, 3 pages.
VCEG-O34r1, Enhanced coding of coefficients, ITU—Telecommunications Standardization Sector Study Group 16 Question 6, Video Coding Experts Group (VCEG), 15$^{th}$ Meeting, Pattaya, Thailand, Dec. 4-6, 2001, 5 pages.
VCEG-O34r2, Enhanced coding of coefficients, ITU—Telecommunications Standardization Sector Study Group 16 Question 6, Video Coding Experts Group (VCEG), 15$^{th}$ Meeting, Pattaya, Thailand, Dec. 4-6, 2001, 5 pages.
VCEG-O36, "Verification of Adaptive Double Scan on Common Conditions" ITU—Telecommunications Standardization Sector Study Group 16 Question 6, Video Coding Experts Group (VCEG), 15$^{th}$ Meeting, Pattaya, Thailand, Dec. 4-6, 2001, 3 pages.
VCEG-O36r1, "Verification of Adaptive Double Scan on Common Conditions" ITU—Telecommunications Standardization Sector Study Group 16 Question 6, Video Coding Experts Group (VCEG), 15$^{th}$ Meeting, Pattaya, Thailand, Dec. 4-6, 2001, 6 pages.
Invitation to the Fifteenth VCEG Meeting Pattaya, Thailand, Dec. 4-6, 2001, to ITU-T Q.6/16 Video Coding Experts Group (VCEG), Version: Nov. 21, 2001, 3 pages.
Microsoft WMV WMA 8.0 Press Release, Microsoft Delivers Breakthrough Audio and Video Quality With Final Release of Windows Media Audio and Video 8, Mar. 28, 2001, 7 pages.
U.S. Appl. No. 60/341,674, filed Dec. 17, 2001, 323 pages.
WMV Version 8.0, Windows Media Video V8 Decoding Specification, 171 pages.
W. Gao et al, "Advanced Video Coding Systems" Chapter 2 Video Coding Basic Principle, 2014, 19 pages.
A.J. Pinho, "Adaptive Context-Based Arithmetic Coding of Arbitrary Contour Maps" IEEE Signal Processing Letters, vol. 8, No. 1, Jan. 2001, pp. 4-6.
Q. Wang et al, "Context-Based 2D-VLC Entropy Coder in AVS Video Coding Standard" J. Comput. Sc. & Technol., May 2006, vol. 21, No. 3, pp. 315-322.
T. Sikora, "Digital Video Coding Standards and Their Role in Video Communications" Signal Processing for Multimedia, 1999, pp. 225-252.
W. Jiang et al, "Forward/Backward Adaptive Context Selection with Applications to Motion Vector Field Encoding" Oct. 1997, pp. 168-171.
Microsoft PowerPoint, The H.264/AVC Video Coding Standard, Gary J. Sullivan, Ph.D., Nov. 2007, 6 pages.
T. Wiegand et al, "Overview of the H.264/AVC Video Coding Standard" IEEE Transactions on Circuits and Systems for Video Technology, vol. 13, No. 7, Jul. 2003, pp. 560-576.
H.264 / MPEG-4 Part 10 White Paper, Overview of H.264, Oct. 2002, 47 pages.
F. Hartung et al, "Improved Encoding of DCT Coefficients for Low Bit-Rate Video Coding Using Multiple VLC Tables" 1999, pp. 51-55.
C. Buchner et al, "Progressive Texture Video Coding" 2001, pp. 1813-1816.
D. Marpe et al, "Video Compression Using Context-Based Adaptive Arithmetic Coding" Feb. 2001, pp. 558-561.
Panasonic Broadcast, AVC-Intra (H.264 Intra) Compression, Sep. 7, 2007, Version 3.0, pp. 1-7.
U.S. Appl. No. 10/232,337, filed Aug. 30, 2002, 103 pages.
U.S. Appl. No. 60/367,032, filed Mar. 22, 2002, 9 pages.
J. Yoshida, "TI and UB Video get a jump on H.264 decoding" EE Times, Dec. 2, 2002, 3 pages.
UB Video Inc., Emerging H.264 Standard: Overview and TMS320C64x Digital Media Platform Implementation White Paper, 2002, 13 pages.
UB Video Inc., Emerging H.26L Standard: Overview and TMS320C64x Digital Media Platform Implementation White Paper, 2002, 12 pages.
Microsoft Corporation, Advanced Systems Format (ASF) 2001, 50 pages.

(56) References Cited

OTHER PUBLICATIONS

H.263 ITU-T Telecommunication Standardization Sector of ITU, Transmission of Non-Telephone Signals, Video Coding For Low Bit Rate Communication, ITU-T Recommendation H.263, 1996, 52 pages.
H.263 ITU-T Telecommunication Standardization Sector of ITU, Series H: Audiovisual and Multimedia Systems, Infrastructure of audiovisual services—Coding of moving video, Video Coding For Low Bit Rate Communication, ITU-T Recommendation H.263, Feb. 1998, 167 pages.
H.323 ITU-T Telecommunication Standardization Sector of ITU, Series H: Audiovisual and Multimedia Systems, Infrastructure of audiovisual services—Systems and terminal equipment for audiovisual services, Packet-based multimedia communications systems, ITU-T Recommendation H.323, Feb. 1998, 128 pages.
Text for ISO/IEC FCD 14496-1 Systems, International Organisation for Standardisation, ISO/IEC JTC1/SC29/WG11, Coding of Moving Pictures and Audio, May 15, 1998, 282 pages.
International Standard ISO/IEC 14496-2, Second edition, Dec. 1, 2001, Information technology—Coding of audio-visual objects—Part 2: Visual, 536 pages.
International Standard ISO/IEC 14496-3, Second edition, Dec. 15, 2001, Information technology—Coding of audio-visual objects—Part 3: Audio, 110 pages.
IEEE, "Part 11: Wireless LAN Medium Access Control (MAC) and Physical Layer (PHY) specifications High-speed Physical Layer in the 5 GHz Band" 2003, 91 pages.
3GPP TS 25.212 V7.0.0, Mar. 2006, $3^{rd}$ Generation Partnership Project; Technical Specification Group Radio Access Network; Multiplexing and channel coding (FDD) Release 7, 84 pages.
3GPP TS 25.212 V7.7.0, Nov. 2007, $3^{rd}$ Generation Partnership Project; Technical Specification Group Radio Access Network; Multiplexing and channel coding (FDD) Release 7, 103 pages.
3GPP TS 25.214 V7.0.0, Mar. 2006, $3^{rd}$ Generation Partnership Project; Technical Specification Group Radio Access Network; Physical layer procedures (FDD) (Release 7), 60 pages.
3GPP TS 25.214 V7.7.0, Nov. 2007, $3^{rd}$ Generation Partnership Project; Technical Specification Group Radio Access Network; Physical layer procedures (FDD) (Release 7), 85 pages.
3GPP TS 36.201 V8.0.0, Sep. 2007, $3^{rd}$ Generation Partnership Project; Technical Specification Group Radio Access Network; Evolved Universal Terrestrial Radio Access (E-UTRA); Long Term Evolution (LTE) physical layer; General description (Release 8), 13 pages.
3GPP TS 36.212 V8.0.0, Sep. 2007, $3^{rd}$ Generation Partnership Project; Technical Specification Group Radio Access Network; Evolved Universal Terrestrial Radio Access (E-UTRA); Multiplexing and channel coding (Release 8), 30 pages.
3GPP TS 36.213 V8.0.0, Sep. 2007, $3^{rd}$ Generation Partnership Project; Technical Specification Group Radio Access Network; Evolved Universal Terrestrial Radio Access (E-UTRA); Physical layer procedures (Release 8), 13 pages.
3GPP TS 36.321 V1.0.0, Sep. 2007, $3^{rd}$ Generation Partnership Project; Technical Specification Group Radio Access Network; Evolved Universal Terrestrial Radio Access (E-UTRA); Medium Access Control (MAC) protocol specification (Release 8), 18 pages.
3GPP TS 36.321 V2.0.0, Nov. 2007, $3^{rd}$ Generation Partnership Project; Technical Specification Group Radio Access Network; Evolved Universal Terrestrial Radio Access (E-UTRA); Medium Access Control (MAC) protocol specification (Release 8), 23 pages.
U.S. Appl. No. 60/944,770, filed Jun. 18, 2007, 36 pages.
Siemens, "Physical Layer Hybrid ARQ Functionality for HSDPA" Tdoc R1-02-0029, TSG-RAN Working Group #23, Espoo, Finland, Jan. 8-11, 2002, 7 pages.
Samsung, "An efficient signaling on SCCH-HS and channel coding of SCCH-HS" TSGR1#23(02)0051 TSG-RAN Working Group 1 Meeting #23, Espoo Finland, Jan. 8-11, 2002, 11 pages.
Ericsson, "Signaling of Hybrid ARQ Redundancy Version" Tdoc R1-02-0080, TSG-RAN WG1 #23, Espoo, Finland, Jan. 8-11, 2002, 2 pages.
Nokia Siemens Networks, et al., "Way Forward on LTE Rate Matching" Tdoc R1-072273, 3GPP TSG-RAN Working Group 1 #49, Kobe, Japan, May 7-11, 2007, 4 pages.
Ericsson, "Notes from offline discussions on PDCCH contents" R1-073870, TSG-RAN WG1 #50, Athens, Greece, Aug. 20-24, 2007, 3 pages.
Alcatel-Lucent, et al., "Change Request re Clarification on CQI tables in Rel-7 (Redline)" R1-074462, 3GPP TSG RAN WG1 meeting #50bis, Shanghai, China, Oct. 8-12, 2007, 11 pages.
Ericsson, et al. "Inclusion of CQI tables for the combination of 64QAM and MIMO (Redline)" R1-075029, 3GPP TS RAN WG1 Meeting #51, Jeju, Korea, Nov. 5-9, 2007, 5 pages.
3GPP TR 25.858 V5.0.0 (With comments), Mar. 2002, $3^{rd}$ Generation Partnership Project; Technical Specification Group Radio Access Network; High Speed Downlink Packet Access: Physical Layer Aspects (Release 5), 31 pages.
ETSI TS 145 001 V6.6.0, Apr. 2005, Digital cellular telecommunications system (Phase 2+); Physical layer on the radio path; General description (3GPP TS 45.001 version 6.6.0 Release 6), 35 pages.
3GPP TS 25.309 V6.6.0, Mar. 2006, $3^{rd}$ Generation Partnership Project; Technical Specification Group Radio Access Network; FDD Enhanced Uplink; Overall description; Stage 2 (Release 6), 34 pages.
3GPP TS 25.321 V6.12.0, Mar. 2007, $3^{rd}$ Generation Partnership Project, Technical Specification Group Radio Access Network; Medium Access Control (MAC) protocol specification (Release 6), 92 pages.
LG Electronics, "Uplink resource request for uplink scheduling" R1-061776, 3GPP TSG RAN WG1 LTE Ad Hoc, Cannes, France, Jun. 27-30, 2006, 3 pages.
Qualcomm, "SI Transmission Triggering Schemes" R2-050956, 3GPP TSG-RAN WG2 meeting #46bis, Apr. 4-8, 2005, Beijing, China, 3 pages.
Alcatel, "SI Triggering for total buffer status and highest priority data" R2-052024, 3GPP TSG-RAN WG2 meeting #48, Oct. 2005, London, UK, 2 pages.
3GPP TS 25.309 V6.3.0, Jun. 2005, $3^{rd}$ Generation Partnership Project; Technical Specification Group Radio Access Network; FDD Enhanced Uplink; Overall description; Stage 2 (Release 6), 33 pages.
Nokia, "Buffer Reporting for E-UTRAN" R2-060829, 3GPP TSG-RAN WG2 Meeting #52, Athens, Greece, Mar. 27-31, 2006, 5 pages.
NTT DoCoMo, Inc., "Uplink resource allocation scheme" R2-062164, 3GPP TSG RAN WG2 #54, Aug. 28-Sep. 1, 2006, Tallinn, Estonia, 5 pages.
Ericsson, "Scheduling request triggering criterions" Tdoc R2-072578, 3GPP TSG-RAN WG2 #58bis, Orlando, USA, Jun. 25-29, 2007, 3 pages.
Ericsson, "Buffer Reporting for LTE UL" Tdoc R2-072579, 3GPP TSG-RAN WG2 #58bis, Orlando, USA, Jun. 25-29, 2007, 3 pages.
Ericsson, "Scheduling request triggering criterions for LTE" Tdoc R2-073209, 3GPP TSG-RAN WG2 #59, Athens, Greece, Aug. 20-24, 2007, 3 pages.
ZTE, "intra-RAT handover access procedure" R2-061229, TSG-RAN Working Group 2 meeting #52, Shanghai, China, May 8-12, 2006, 4 pages.
TD Tech, "Enhancement to buffer status reporting" Tdoc R2-070792, 3GPP TSG RAN WG2#57, St. Louis, US, Feb. 12-16, 2007, 5 pages.
Catt, Ritt, "Enhancement to Buffer Status Reporting" R2-071345, 3GPP TSG-RAN WG2#57bis, St. Julian's, Malta, Mar. 26-30, 2007, 5 pages.
Draft Change Request, Update of 36.212 version 8.0.0, R1-07xxxx, 3GPP TSG-RAN WG1 #51, Jeju, Korea, Nov. 5-9, 2007, 28 pages.
NTT DoCoMo et al, "Single-Carrier Based Multiplexing of Uplink L1/L2 Control Channel" R1-062740, 3GPP TSG RAN WG1 Meeting #46bis, Seoul, Korea, Oct. 9-13, 2006 (Original R1-061674), 9 pages.
ZTE, "Uplink non-data-associated control signaling" R1-070205, 3GPP TSG-RAN WG1 #47bis, Sorrento, Italy, Jan. 15-19, 2007, 3 pages.

(56) References Cited

OTHER PUBLICATIONS

Texas Instruments, "Summary of Reflector Discussions on EUTRA UL DM RS" R1-070266, 3GPP TSG RAN WGl#47bis, Sorrento, Italy, Jan. 15-19, 2007, 3 pages.
Samsung, "Uplink control channel multiplexing" R1-070330, 3GPP TSG RAN WG1 Meeting #47bis, Sorrento, Italy, Jan. 15-19, 2007, 4 pages.
Texas Instruments, "Precoding Codebook Design for 2 Node-B Antenna" R1-070729, 3GPP TSG RAN WG1#48, St. Louis, USA, Feb. 12-16, 2007, 5 pages.
Motorola, "Multiplexing of Uplink Control Signaling with Data" R1-070777, 3GPP TSG RAN1 #48, St. Louis, USA, Feb. 12-16, 2007, 3 pages.
Nokia, "Data-non-associated control signal transmission with UL data" R1-071000, 3GPP TSG RAN WG1 Meeting #48, St. Louis, USA, Feb. 12-16, 2007, 5 pages.
ZTE, "Uplink control signaling, ACK/NACK multiplexing" R1-071308, 3GPP TSG-RAN WG1 #48bis, St. Julian, Malta, Mar. 26-30, 2007, 5 pages.
NEC Group et al., "Multiplexing of uplink data-non-associated control signal with data" R1-072121, 3GPP TSG RAN WG1 Meeting #49, Kobe, Japan, May 7-11, 2007, 4 pages.
NEC Group, "Multiplexing of uplink data-non-associated control signal without data" R1-072122, 3GPP TSG RAN WG1 Meeting #49, Kobe, Japan, May 7-11, 2007, 3 pages.
Qualcomm Europe, "Rate matching details for control and data multiplexing" R1-073269, An5xter73GPP TSG-RAN WG1 #50, Athens, Greece, Aug. 20-24, 2007, 6 pages.
Motorola, "Uplink channel interleaving" R1-073361, 3GPP TSG RAN1 #50, Athens, Greece, Aug. 20-24, 2007, 11 pages.
Motorola, "UL L1/L2 Control Signals with Data: Multiplexing Detail" R1-073388, 3GPP TSG RAN1#50, Athens, Greece, Aug. 20-24, 2007, 3 pages.
Catt et al, "PUCCH channel structure for TDD with FS2" R1-073529, 3GPP TSG RAN WG1 Meeting #50, Athens, Greece, Aug. 20-24, 2007, 5 pages.
Samsung, "Control signaling Location in Presence of Data in E-UTRA UL" R1-073572, 3GPP TSG RAN WG1 Meeting #50, Athens, Greece, Aug. 20-24, 2007, 4 pages.
Ad hoc chairman, "Notes from uplink control signaling discussions" R1-073842, TSG-RAN WG1 #50, Athens, Greece, Aug. 20-24, 2007, 1 page.
Qualcomm Europe, "Details of control and data multiplexing in PUSCH" R1-073926, 3GPP TSG-RAN WG1 #50-bis, Shanghai, China, Oct. 8-12, 2007, 3 pages.
Change Request, Update of 36.212 version 8.0.0, R1-075111, 3GPP TSG-RAN WG1 #51, Jeju, Korea, Nov. 5-9, 2007, 36 pages.
LG Electronics, "PUSCH multiplexing of data, control, and ACK/NACK information" R1-080267, 3GPP TSG RAN WGl#51bis, Sevilla, Spain, Jan. 14-18, 2008, 19 pages.
U.S. Appl. No. 60/890,589 filed Feb. 19, 2007, 14 pages.
ETSI TS 125 214 V5.11.0, Universal Mobile Telecommunications System (UMTS); Physical layer procedures (FDD) (3GPP TS 25.214 version 5.11.0 Release 5), Jun. 2005, 53 pages.
3GPP TR 25.814 V1.2.0, 3$^{rd}$ Generation Partnership Project; Technical Specification Group Radio Access Network; Physical Layer Aspects for Evolved UTRA (Release 7), Feb. 2006, 84 pages.
3GPP TR 25.876 V1.8.0, 3$^{rd}$ Generation Partnership Project; Technical Specification Group Radio Access Network; Multiple-Input Multiple Output in UTRA, Oct. 2005, 73 pages.
U.S. Appl. No. 60/786,445, filed Mar. 27, 2006, 28 pages.
Lucent Technologies, "Increasing MIMO throughput with per-antenna rate control" TSG-R1(01)0879, 3GPP TSG RAN WG1, 13 pages.
Ericsson, "On the E-UTRA time-frequency granularity" R1-050449, TSG-RAN WG1 #41, Athens, Greece, May 9-13, 2005, 2 pages.
NTT DoCoMo, "Physical Channels and Multiplexing in Evolved UTRA Downlink" R1-050590, 3GPP TSG RAN WG1 Ad Hoc on LTE, Sophia Antipolis, France, Jun. 20-21, 2005, 24 pages.

Huawei, "Motivation for localized and distributed physical subchannels in EUTRA" R1-050631, 3GPP TSG RAN WG1 Ad Hoc, Sophia Antipolis, France, Jun. 20-21, 2005, 5 pages.
NTT DoCoMo, NEC, Sharp, "Physical Channels and Multiplexing in Evolved UTRA Downlink" R1-050707, 3GPP TSG RAN WG1 #42 on LTE (Original R1-050590), London, UK, Aug. 29-Sep. 2, 2005, 15 pages.
Qualcomm Europe, "Description and link simulations of MIO schemes for OFDMA based E-UTRA downlink evaluation" R1-050903, 3GPP TSG-RAN WG1 #42, Aug. 29-Sep. 2, 2005, London, United Kingdom, 12 pages.
Motorola, "CQI Feedback Scheme for EUTRA" R1-051334, 3GPP TSG RAN1#43, Seoul, Korea, Nov. 7-Nov. 11, 2005, 9 pages.
Siemens, "Relation between chunk-size and CQI signaling" R1-051364, TSG-RAN WG1 #43, Seoul, Korea, Nov. 7-11, 2005, 2 pages.
BenQ Mobile, "Downlink Beamforming with Opportunistic Scheduling" R1-051416, TSG-RAN WG1 #43, Seoul, Korea, Nov. 7-11, 2005, 5 pages.
Qualcomm Europe, "Control Channel Issues for DL MIMO" 3GPP TSG-RAN WG1 #44, R1-060455, 3GPP TSG-RAN WG1 #44, Denver, USA, Feb. 13-17, 2006, 5 pages.
Qualcomm Europe, "Description of Single and Multi Codeword Schemes with Precoding" R1-060457, 3GPP TSG-RAN WG1 #44, Denver, USA, Feb. 13-17, 2006, 9 pages.
Qualcomm Europe, "Implications of MCW MIMO on DL HARQ" R1-060459, 3GPP TSG-RAN WG1 #44, Denver, USA, Feb. 13-17, 2006, 5 pages.
LG Electronics, "L1/L2 collaborated signaling for delivering CQI feedback information" R1-060539, 3GPP TSG RAN WG1 #44 meeting, Denver, USA, Feb. 13-17, 2006, 5 pages.
Nokia, Ericsson, "OFDMA Downlink Physical layer measurements—text proposal" R1-060707, 3 GPP TSG RAN WG1#44, Denver, CO, USA, Feb. 13-17, 2006, 3 pages.
Nokia, Ericsson, Alcatel, Samsung, "OFDMA Downlink Physical layer measurements—text proposal" R1-060742, 3GPP TSG RAN WG1#44, Denver, CO, USA, Feb. 13-17, 2006, 3 pages.
Nokia, "OFDMA Downlink Physical layer measurements—text proposal" R1-060757, 3GPP TSG Ran WG#44, Denver, CO, USA, Feb. 13-17, 2006, 3 pages.
Panasonic, "Indication of combination between L1/L2 control signaling and uplink data" R1-060793, TSG-RAN WG1 Meeting#44bis, Athens, Greece, Mar. 27-31, 2006, 3 pages.
Huawei, "Downlink adaptation/scheduling guided by an efficient CQI-feedback scheme" R1-060821, TSG RAN WG1 meeting 44bis, Athens, Mar. 27-31, 2006, 5 pages.
Motorola, "Frequency Domain Scheduling for E-UTRA" R1-060877, 3GPP TSG RAN1#44bis, Athens, Greece, Mar. 27-31, 2006, 7 pages.
Motorola, "Overhead Analysis and Resource Assignment for Uplink CQI Feedback Channel and TP" R1-060881, 3GPP TSG RAN1#44bis, Athens, Greece, Mar. 27-31, 2006, 8 pages.
Ritt, "Performance of IDMA-based inter-cell interference cancellation" R1-060895, 3GPP TSG-RAN WG1 #44-bis Meeting, Athens, Greece, Mar. 27-31, 2006, 6 pages.
LG Electronics, "L1/L2 signaling for CQI reporting considering multiple streams transmission" R1-060920, 3GPP TSG RAN WG1 #44bis meeting, Athens, Greece, Mar. 27-31, 2006, 6 pages.
W. Gao et al, Chapter 2, "Video Coding Basic Principle" *Advanced Video Coding Systems*, 2014, 19 pages.
A.J. Pinho, "Adaptive Context-Based Arithmetic Coding of Arbitrary Contour Maps" *IEEE Signal Processing Letters*, vol. 8, No. 1, Jan. 2001, 3 pages.
Q. Wang et al, "Context-Based 2D-VLC Entropy Coder in AVS Video Coding Standard" *J. Comput. Sci. & Technol.*, vol. 21, No. 3, May 2006, pp. 315-322.
W. Jiang et al, "Forward/Backward Adaptive Context Selection with Applications to Motion Vector Field Encoding" IEEE 1997, pp. 168-171.
G.J. Sullivan, "The H.264/AVC Video Coding Standard" Nov. 2007, 6 pages.
I.E.G. Richardson, H.264 / MPEG-4 Part 10 White Paper, Overview, www.vcodex.com, Oct. 7, 2002, 3 pages.

(56) References Cited

OTHER PUBLICATIONS

I.E.G. Richardson, H.264 / MPEG-4 Part 10 White Paper, Intra Prediction, www.vcodex.com, Apr. 30, 2003, 6 pages.
I.E.G. Richardson, H.264 / MPEG-4 Part 10 White Paper, Inter Prediction, www.vcodex.com, Apr. 30, 2003, 3 pages.
I.E.G. Richardson, H.264 / MPEG-4 Part 10 White Paper, Transform & Quantization, www.vcodex.com, Mar. 19, 2003, 9 pages.
I.E.G. Richardson, H.264 / MPEG-4 Part 10 White Paper, Reconstruction Filter, www.vcodex.com, Apr. 30, 2003, 5 pages.
I.E.G. Richardson, H.264 / MPEG-4 Part 10 White Paper, Variable Length Coding, www.vcodex.com, Oct. 17, 2002, 7 pages.
I.E.G. Richardson, H.264 / MPEG-4 Part 10 White Paper, Introduction to CABAC, www.vcodex.com, Oct. 17, 2002, 3 pages.
I.G. Richardson, H.264 / AVC, Frame and picture management, Draft 1.0, Jan. 29, 2004, 7 pages.
I.E.G. Richardson, H.264 / MPEG-4 Part 10 White Paper, SP and SI slices, www.vcodex.com, Jan. 31, 2003, 4 pages.
F. Hartung, "Improved Encoding of DCT Coefficients for Low Bit-Rate Video Coding Using Multiple VLC Tables" IEEE 1999, pp. 51-55.
C. Buchner et al, "Progressive Texture Video Coding" IEEE 2001, pp. 1813-1816.
D. Marpe et al, "Video Compression Using Context-Based Adaptive Arithmetic Coding" IEEE 2001, pp. 558-561.
Panasonic Broadcast, AVC-Intra (H.264 Intra) Compression Technology Overview, Version 3.0, Sep. 7, 2007, pp. 1-7.
J. Yoshida et al, "TI and UB Video get a jump on H.264 decoding" EE Times, Dec. 2, 2002, 3 pages.
Microsoft Corporation, Advanced Systems Format (ASF) v. 1.0, 2001, 50 pages.
International Telecommunication Union, Telecommunication Standardization Sector of ITU H.263, "Transmission of Non-Telephone Signals—Video Coding For Low Bit Rate Communication" ITU-T Recommendation H.263, Mar. 1996, 52 pages.
International Telecommunication Union, Telecommunication Standardization Sector of ITU H.263, "Series H: Audiovisual and Multimedia Systems Infrastructure of audiovisual services—Coding of moving video—Video coding for low bit rate communication" ITU-T Recommendation H.263, Feb. 1998, 167 pages.
International Telecommunication Union, Telecommunication Standardization Sector of ITU H.323, "Series H: Audiovisual and Multimedia Systems Infrastructure of audiovisual services—Systems and terminal equipment for audiovisual services—Packet-based multimedia communications systems" ITU-T Recommendation H.323, Feb. 1998, 128 pages.
ISO/IEC JTC1/SC29/WG11 N2201, Text for ISO/IEC FCD 14496-1 Systems, Information Technology—Generic Coding of Audio-Visual Objects, Part 1: Systems, Final Committee Draft of International Standard, May 15, 1998, 282 pages.
ISO/IEC 14496-2 International Standard Second edition, Information technology—Coding of audio-visual objects—Part 2: Visual, Dec. 1, 2001, 536 pages.
ISO/IEC 14496-3 International Standard Second edition, Information technology—Coding of audio-visual objects—Part 3: Audio, Dec. 15, 2001, 110 pages.
Korean Notice of Preliminary Rejection dated Jan. 15, 2018 in KR 10-2017-7001703 and English translation, 8 pages.
Korean Notice of Final Rejection dated Jul. 25, 2018 in Korean Application No. 10-2017-7001703 and English translation, 10 pages.
Indian Office Action dated Aug. 1, 2018 in IN Application No. 2119/KOLNP/2010, 6 pages.
Examination Report dated Aug. 22, 2018 in AU Application No. 2017218949, 3 pages.
Notice of Preliminary Rejection dated Jan. 18, 2019 in KR Application No. 10-2018-7034008 and English translation, 8 pages.
3GPP Technical Specification Group Services and System Aspects of the European Telecommunications Standards Institute (ETSI), 3GPP TS 25.212 V7.6.0, Sep. 2007, 105 pages.
3GPP Technical Specification Group Services and System Aspects of the European Telecommunications Standards Institute (ETSI), 3GPP TS 25,214 V7.6.0, Sep. 2007, 86 pages.
Nokia, R1-041149, 3GPP TSG RAN WG1 #38, "Implicit Redundancy Version for IR HARQ Scheme", Sep. 24, 2004, 4 pages.
Motorola, R1-074587, 3GPP TSG RAN WG1 #51, "PDCCH Formats (A) for Scheduling Grants", Nov. 9, 2007, 4 pages.
Nokia, Nokia Siemens Networks, R1-074873, 3GPP TSG RAN WG1 #51, "DL-CCH formats", Nov. 9, 2007, 6 pages.
Qualcomm Europe, R1-074951, 3GPP TSG RAN WG1 #51, "PDCCH Formats and Contents", Nov. 9, 2007, 7 pages.

* cited by examiner

CONTROL CHANNEL SIGNALING USING A COMMON SIGNALING FIELD FOR TRANSPORT FORMAT, REDUNDANCY VERSION, AND NEW DATA INDICATOR

CROSS-REFERENCE TO RELATED APPLICATION

This is a continuation of application Ser. No. 15/041,439, filed Feb. 11, 2016, which is a continuation of application Ser. No. 14/607,312, filed Jan. 28, 2015, granted as U.S. Pat. No. 9,295,053, which is a continuation of application Ser. No. 13/744,244, filed Jan. 17, 2013, granted as U.S. Pat. No. 8,948,117, which is a continuation of application Ser. No. 12/809,423, filed Aug. 16, 2010, granted as U.S. Pat. No. 8,385,284, which is a national stage of PCT/EP2008/010845, filed Dec. 18, 2008 and claims priority to EP 07024829.9, filed Dec. 20, 2007, the entire contents of each of which are incorporated by reference herein.

FIELD

The invention relates to a method for providing control signalling associated to a protocol data unit conveying user data in a mobile communication system and to the control channel signal itself. Furthermore, the invention also provides a mobile station and a base station and their respective operation in view of the newly defined control channel signals defined herein.

TECHNICAL BACKGROUND

Packet-Scheduling and Shared Channel Transmission

In wireless communication systems employing packet-scheduling, at least part of the air-interface resources are assigned dynamically to different users (mobile stations—MS or user equipments—UE). Those dynamically allocated resources are typically mapped to at least one Physical Uplink or Downlink Shared CHannel (PUSCH or PDSCH). A PUSCH or PDSCH may for example have one of the following configurations:

One or multiple codes in a CDMA (Code Division Multiple Access) system are dynamically shared between multiple MS.

One or multiple subcarriers (subbands) in an OFDMA (Orthogonal Frequency Division Multiple Access) system are dynamically shared between multiple MS.

Combinations of the above in an OFCDMA (Orthogonal Frequency Code Division Multiple Access) or a MC-CDMA (Multi Carrier-Code Division Multiple Access) system are dynamically shared between multiple MS.

FIG. 1 shows a packet-scheduling system on a shared channel for systems with a single shared data channel. A sub-frame (also referred to as a time slot) reflects the smallest interval at which the scheduler (e.g. the Physical Layer or MAC Layer Scheduler) performs the dynamic resource allocation (DRA). In FIG. 1, a TTI (transmission time interval) equal to one sub-frame is assumed. It should be born noted that generally a TTI may also span over multiple sub-frames.

Further, the smallest unit of radio resources (also referred to as a resource block or resource unit), which can be allocated in OFDM systems, is typically defined by one sub-frame in time domain and by one subcarrier/subband in the frequency domain. Similarly, in a CDMA system this smallest unit of radio resources is defined by a sub-frame in the time domain and a code in the code domain.

In OFCDMA or MC-CDMA systems, this smallest unit is defined by one sub-frame in time domain, by one subcarrier/subband in the frequency domain and one code in the code domain. Note that dynamic resource allocation may be performed in time domain and in code/frequency domain.

The main benefits of packet-scheduling are the multi-user diversity gain by time domain scheduling (TDS) and dynamic user rate adaptation.

Assuming that the channel conditions of the users change over time due to fast (and slow) fading, at a given time instant the scheduler can assign available resources (codes in case of CDMA, subcarriers/subbands in case of OFDMA) to users having good channel conditions in time domain scheduling.

Specifics of DRA and Shared Channel Transmission in OFDMA

Additionally to exploiting multi-user diversity in time domain by Time Domain Scheduling (TDS), in OFDMA multi-user diversity can also be exploited in frequency domain by Frequency Domain Scheduling (FDS). This is because the OFDM signal is in frequency domain constructed out of multiple narrowband subcarriers (typically grouped into subbands), which can be assigned dynamically to different users. By this, the frequency selective channel properties due to multi-path propagation can be exploited to schedule users on frequencies (subcarriers/subbands) on which they have a good channel quality (multi-user diversity in frequency domain).

For practical reasons in an OFDMA system the bandwidth is divided into multiple subbands, which consist out of multiple subcarriers. I.e. the smallest unit on which a user may be allocated would have a bandwidth of one subband and a duration of one slot or one sub-frame (which may correspond to one or multiple OFDM symbols), which is denoted as a resource block (RB). Typically, a subband consists of consecutive subcarriers. However, in some case it is desired to form a subband out of distributed non-consecutive subcarriers. A scheduler may also allocate a user over multiple consecutive or non-consecutive subbands and/or sub-frames.

For the 3GPP Long Term Evolution (3GPP TR 25.814: "Physical Layer Aspects for Evolved UTRA", Release 7, v. 7.1.0, October 2006—available at http://www.3gpp.org and incorporated herein by reference), a 10 MHz system (normal cyclic prefix) may consist out of 600 subcarriers with a subcarrier spacing of 15 kHz. The 600 subcarriers may then be grouped into 50 subbands (a 12 adjacent subcarriers), each subband occupying a bandwidth of 180 kHz. Assuming, that a slot has a duration of 0.5 ms, a resource block (RB) spans over 180 kHz and 0.5 ms according to this example.

In order to exploit multi-user diversity and to achieve scheduling gain in frequency domain, the data for a given user should be allocated on resource blocks on which the users have a good channel condition. Typically, those resource blocks are close to each other and therefore, this transmission mode is in also denoted as localized mode (LM).

An example for a localized mode channel structure is shown in FIG. 2. In this example neighboring resource blocks are assigned to four mobile stations (MS1 to MS4) in the time domain and frequency domain. Each resource block consists of a portion for carrying Layer 1 and/or Layer 2 control signaling (L1/L2 control signaling) and a portion carrying the user data for the mobile stations.

Alternatively, the users may be allocated in a distributed mode (DM) as shown in FIG. 3. In this configuration, a user (mobile station) is allocated on multiple resource blocks, which are distributed over a range of resource blocks. In distributed mode a number of different implementation options are possible. In the example shown in FIG. 3, a pair of users (MSs 1/2 and MSs 3/4) shares the same resource blocks. Several further possible exemplary implementation options may be found in 3GPP RAN WG #1 Tdoc R1-062089, "Comparison between RB-level and Sub-carrier-level Distributed Transmission for Shared Data Channel in E-UTRA Downlink", August 2006 (available at http://www.3gpp.org and incorporated herein by reference).

It should be noted, that multiplexing of localized mode and distributed mode within a sub-frame is possible, where the amount of resources (RBs) allocated to localized mode and distributed mode may be fixed, semi-static (constant for tens/hundreds of sub-frames) or even dynamic (different from sub-frame to sub-frame).

In localized mode as well as in distributed mode in—a given sub-frame—one or multiple data blocks (which are inter alia referred to as transport-blocks) may be allocated separately to the same user (mobile station) on different resource blocks, which may or may not belong to the same service or Automatic Repeat reQuest (ARQ) process. Logically, this can be understood as allocating different users.

L1/L2 Control Signaling

In order to provide sufficient side information to correctly receive or transmit data in systems employing packet scheduling, so-called L1/L2 control signaling (Physical Downlink Control CHannel—PDCCH) needs to be transmitted. Typical operation mechanisms for downlink and uplink data transmission are discussed below.

Downlink Data Transmission

Along with the downlink packet data transmission, in existing implementations using a shared downlink channel, such as 3GPP-based High Speed Data Packet Access (HSDPA), L1/L2 control signaling is typically transmitted on a separate physical (control) channel.

This L1/L2 control signaling typically contains information on the physical resource(s) on which the downlink data is transmitted (e.g. subcarriers or subcarrier blocks in case of OFDM, codes in case of CDMA). This information allows the mobile station (receiver) to identify the resources on which the data is transmitted. Another parameter in the control signaling is the transport format used for the transmission of the downlink data.

Typically, there are several possibilities to indicate the transport format. For example, the transport block size of the data (payload size, information bits size), the Modulation and Coding Scheme (MC S) level, the Spectral Efficiency, the code rate, etc. may be signaled to indicate the transport format (TF). This information (usually together with the resource allocation) allows the mobile station (receiver) to identify the information bit size, the modulation scheme and the code rate in order to start the demodulation, the de-rate-matching and the decoding process. In some cases the modulation scheme may be signaled explicitly.

In addition, in systems employing Hybrid ARQ (HARQ), HARQ information may also form part of the L1/L2 signaling. This HARQ information typically indicates the HARQ process number, which allows the mobile station to identify the Hybrid ARQ process on which the data is mapped, the sequence number or new data indicator, allowing the mobile station to identify if the transmission is a new packet or a retransmitted packet and a redundancy and/or constellation version. The redundancy version and/or constellation version tells the mobile station, which Hybrid ARQ redundancy version is used (required for de-rate-matching) and/or which modulation constellation version is used (required for demodulation).

A further parameter in the HARQ information is typically the UE Identity (UE ID) for identifying the mobile station to receive the L1/L2 control signaling. In typical implementations this information is used to mask the CRC of the L1/L2 control signaling in order to prevent other mobile stations to read this information.

The table below (Table 1) illustrates an example of a L1/L2 control channel signal structure for downlink scheduling as known from 3GPP TR 25.814 (see section 7.1.1.2.3—FFS=for further study):

TABLE 1

| | Field | | Size | Comment |
|---|---|---|---|---|
| Cat. 1 (Resource indication) | ID (UE or group specific) | | [8-9] | Indicates the UE (or group of UEs) for which the data transmission is intended |
| | Resource assignment | | FFS | Indicates which (virtual) resource units (and layers in case of multi-layer transmission) the UE(s) shall demodulate. |
| | Duration of assignment | | 2-3 | The duration for which the assignment is valid, could also be used to control the TTI or persistent scheduling. |
| Cat. 2 (transport format) | Multi-antenna related information | | FFS | Content depends on the MIMO/beamforming schemes selected. |
| | Modulation scheme | | 2 | QPSK, 16QAM, 64QAM . . . In case of multi-layer transmission, multiple instances may be required. |
| | Payload size | | 6 | Interpretation could depend on e.g. modulation scheme and the number of assigned resource units (c.f. HSDPA). In case of multi-layer transmission, multiple instances may be required. |
| Cat. 3 (HARQ) | If asynchronous hybrid ARQ is adopted | Hybrid ARQ process number | 3 | Indicates the hybrid ARQ process the current transmission is addressing. |
| | | Redundancy version | 2 | To support incremental redundancy. |
| | | New data indicator | 1 | To handle soft buffer clearing. |
| | If synchronous hybrid ARQ is adopted | Retransmission sequence number | 2 | Used to derive redundancy version (to support incremental redundancy) and 'new data indicator' (to handle soft buffer clearing). |

Uplink Data Transmission

Similarly, also for uplink transmissions, L1/L2 signaling is provided on the downlink to the transmitters in order to inform them on the parameters for the uplink transmission. Essentially, the L1/L2 control channel signal is partly similar to the one for downlink transmissions. It typically indicates the physical resource(s) on which the UE should transmit the data (e.g. subcarriers or subcarrier blocks in case of OFDM, codes in case of CDMA) and a transport format the mobile station should use for uplink transmission. Further, the L1/L2 control information may also comprise Hybrid ARQ information, indicating the HARQ process number, the sequence number or new data indicator, and further the redundancy and/or constellation version. In addition, there may be a UE Identity (UE ID) comprised in the control signaling.

Variants

There are several different flavors how to exactly transmit the information pieces mentioned above. Moreover, the L1/L2 control information may also contain additional information or may omit some of the information. For example, the HARQ process number may not be needed in case of using no or a synchronous HARQ protocol. Similarly, the redundancy and/or constellation version may not be needed, if for example Chase Combining is used (i.e. always the same redundancy and/or constellation version is transmitted) or if the sequence of redundancy and/or constellation versions is pre-defined.

Another variant may be to additionally include power control information in the control signaling or MIMO related control information, such as e.g. pre-coding information. In case of multi-codeword MIMO transmission transport format and/or HARQ information for multiple code words may be included.

In case of uplink data transmission, part or all of the information listed above may be signaled on uplink, instead of on the downlink. For example, the base station may only define the physical resource(s) on which a given mobile station shall transmit. Accordingly, the mobile station may select and signal the transport format, modulation scheme and/or HARQ parameters on the uplink. Which parts of the L1/L2 control information is signaled on the uplink and which proportion is signaled on the downlink is typically a design issue and depends on the view how much control should be carried out by the network and how much autonomy should be left to the mobile station.

The table below (Table 2) illustrates an example of a L1/L2 control channel signal structure for uplink scheduling as known from 3GPP TR 25.814 (see section 7.1.1.2.3—FFS=for further study):

TABLE 2

| Field | | Size | Comment |
|---|---|---|---|
| Resource assignment | ID (UE or group specific) | [8-9] | Indicates the UE (or group of UEs) for which the grant is intended |
| | Resource assignment | FFS | Indicates which uplink resources, localized or distributed, the UE is allowed to use for uplink data transmission. |
| | Duration of assignment | 2-3 | The duration for which the assignment is valid. The use for other purposes, e.g., to control persistent scheduling, 'per process' operation, or TTI length, is FFS. |
| TF | Transmission parameters | FFS | The uplink transmission parameters (modulation scheme, payload size, MIMO-related information, etc) the UE shall use. If the UE is allowed to select (part of) the transport format, this field sets determines an upper limit of the transport format the UE may select. |

Another, more recent suggestion of a L1/L2 control signaling structure for uplink and downlink transmission may be found in 3GPP TSG-RAN WG1 #50 Tdoc. R1-073870, "Notes from offline discussions on PDCCH contents", August 2007, available at http://www.3gpp.org and incorporated herein by reference.

As indicated above, L1/L2 control signaling has been defined for systems that are already deployed to in different countries, such as for example, 3GPP HSDPA. For details on 3GPP HSDPA it is therefore referred to 3GPP TS 25.308, "High Speed Downlink Packet Access (HSDPA); Overall description; Stage 2", version 7.4.0, September 2007 (available at http://www.3gpp.org) and Harri Holma and Antti Toskala, "WCDMA for UMTS, Radio Access For Third Generation Mobile Communications", Third Edition, John Wiley & Sons, Ltd., 2004, chapters 11.1 to 11.5, for further reading.

As described in section 4.6 of 3GPP TS 25.212, "Multiplexing and Channel Coding (FDD)", version 7.6.0, September 2007 (available at http://www.3gpp.org) in HSDPA the "Transport Format" (TF) (Transport-block size information (6 bits)), the "Redundancy and constellation Version" (RV/CV) (2 bits) and the "New Data Indicator" (NDI) (1 bit) are signaled separately by in total 9 bits. It should be noted that the NDI is actually serving as a 1-bit HARQ Sequence Number (SN), i.e. the value is toggled with each new transport-block to be transmitted.

SUMMARY

One object of the invention is to reduce the amount of bits required for control channel signaling, such as for example L1/L2 control signaling, in uplink or downlink. Further, it is desirable that such solution does further not introduce additional problematic HARQ protocol error cases.

The object is solved by the subject matter of the independent claims. Advantageous embodiments of the invention are subject matters of the dependent claims.

One main aspect of the invention is to suggest a new format for the control channel information. According to this aspect, the transport format/transport block size/payload size/modulation and coding scheme and the redundancy version/constellation version for the associated transmission of the user data (typically in form of a protocol data unit or transport block) is provided in a single field of the control channel information. This single field is referred to as the control information field herein, but may for example also be denoted a transport format/redundancy version field or, in abbreviated form, a TF/RV field. In addition, some embodiment of the invention foresee to combine the transport format transport block size/payload size/modulation and coding scheme, the redundancy version/constellation version and additionally HARQ related information (sequence number or new data indicator) within a single field of the control channel information.

According to one embodiment, the invention provides a control channel signal (such as for example a L1/L2 control channel signal) for use in a mobile communication system. The control channel signal is associated to protocol data unit transporting user data and comprises a control information field consisting of a number of bits jointly encoding a transport format and a redundancy version used for transmitting the protocol data unit.

In one exemplary embodiment of the invention, the bits of the control information field jointly encode the transport format, a redundancy version used for transmitting the protocol data unit and a sequence number of the protocol data unit.

Further, in another exemplary embodiment, the bits of the control information field not only jointly encode the transport format and a redundancy version used for transmitting the protocol data unit, but further include a new data indicator for indicating whether the transmission of the protocol data unit is an initial transmission of the user data. Hence, in this example, a single field of the control channel signal is utilized to encode the three before mentioned control information related to the associated transmission of the user data.

According to another exemplary embodiment of the invention, the control information field consists of a number of bits yielding a range of values that can be represented in the control information field (e.g. if there are N bits provided in the field, $2^N$ different values may be represented in the field) and wherein a first subset of the values is reserved for indicating a transport format of the protocol data unit and a second subset of values are reserved for indicating a redundancy version for transmitting the user data. In one exemplary implementation, the first subset of values contains more values than the second subset of values.

Moreover, in another exemplary embodiment of the invention, the redundancy version of the protocol data unit is implicit to its transport format that indicated by the corresponding value of the first subset. In other words, each individual transport format that is represented by a specific bit combination of the first subset is univocally linked to a respective redundancy version so that no explicit signaling of the redundancy version of the protocol data unit is necessary. Another possibility would be that the redundancy version to be used for the initial transmission of the user data in the protocol data unit is fixed or preconfigured.

In another embodiment, it may be assumed that the transmission of the before-mentioned protocol data unit is an initial transmission of the user data. In this case, the value of the encoded information bits in the control channel field is representing a value of the first subset of values. Hence, in general, in case of an initial transmission, the transport format and optionally the redundancy version of the protocol data unit is indicated in the control channel signal. As indicated previously, the redundancy version may also be implicit to the transport format.

In a similar fashion, in case the transmission of the protocol data unit is a retransmission of the user data, the value of the encoded information bits in the control channel field is representing a value of the second subset of values. This may be for example advantageous in a system design, where the transport format (e.g. transport block size) of a protocol data unit does not change between initial transmission and retransmission or if the transport format can be determined from the transport format and the resource allocation information for the initial transmission and the resource allocation information for the retransmission. Accordingly, if a retransmission needs to be sent for the user data, the control channel signal for this retransmission does not need to explicitly signal the transport format for the retransmitted protocol data unit, but rather the bits of the control information field indicate the redundancy version of the protocol data unit, while assuming the transport format of the retransmission to be the same as for the initial transmission or to be determined from the transport format and (optionally) the resource allocation information of the initial transmission and, optionally further, the resource allocation information in the retransmission.

However, in other exemplary designs, the transport format of the initial transmission of the user data may not be known, e.g. in case the receiving terminal has missed the transmission of the control channel signal, or the same transport format can no longer be used for the retransmission, e.g. due to a reconfiguration of resources allocated to the transmission of the protocol data unit. Accordingly, in another embodiment of the invention, in case the transmission of the protocol data unit is a retransmission of the user data, the value of the encoded information bits in the control channel field is representing a value of the first subset or the second subset of values.

Hence, in this example, the control information field may either indicate the redundancy version of the protocol data unit, while assuming the transport format of the retransmission to be known from the initial transmission, or a transport format (and implicitly or explicitly the redundancy version) for the retransmission may be indicated in the retransmission, as appropriate.

Another exemplary embodiment, the transport format, a redundancy version used for transmitting the protocol data unit and a new data indicator for indicating whether the transmission of the protocol data unit is an initial transmission of the user data are assumed to be jointly encoded in the control information field, while the values that can be represented by the control information field bits are again split into a first and second subset in a similar fashion as described above. In this example, use of one of the values of a first subset set also indicates the transmission of the protocol data unit to be an initial transmission. I.e. in this case the values of the first subset may be considered a new data indicator being set, i.e. indicating an initial transmission, while the values of the second subset may be considered a new data indicator not being set, i.e. indicating a retransmission.

In case the sequence number/new data indicator is not jointly encoded together with the transport format and the redundancy version, in an alternative embodiment of the invention, a respective field may be realized in the control channel signal.

According to a further embodiment of the invention, the control channel signal comprises a resource allocation field for indicating the physical radio resource or resources allocated to a receiver for receiving the protocol data unit or the physical radio resource or resources on which a transmitter is to transmit the protocol data unit.

In another embodiment, the control channel signal further comprises a mobile terminal identifier field for indicating the mobile terminal or a group of mobile terminals that are to receive the control channel signal.

In a further embodiment of the invention, the control channel signal or rather the bits of the control information field include a flag indicating the type of information indicated by the remaining bits of the control information field, in case the protocol data packet is a retransmission for the user data.

In an alternative solution according to another embodiment of the invention, another control channel signal is provided. Also this alternative control channel signal is associated to protocol data unit transporting user data and comprises a control information field consisting of a number of bits representing a transport format and implicitly a redundancy version of the protocol data unit, if the transmission of the protocol data unit is an initial transmission of the user data, or representing a redundancy version of the protocol data unit, if the transmission of the protocol data unit is a retransmission of the user data.

Further, in a variation of this embodiment, the bits of the control information field represent a redundancy version and optionally a transport format of the protocol data unit, if the transmission of the protocol data unit is a retransmission.

Another embodiment of the invention relates to a method for encoding control signaling associated to a protocol data unit conveying user data in a mobile communication system. In this method, the base station generates a control channel signal comprising a control information field in which a transport format and a redundancy version of the protocol data unit is jointly encoded, and subsequently transmits the control channel signal to at least one mobile terminal.

In a further embodiment, the base station receives feedback from the at least one mobile terminal. The feedback indicates whether the protocol data unit has been successfully decoded at the mobile terminal. If no successful decoding has been possible, the base station may retransmit the protocol data unit and may further transmit a second control channel signal comprising a control information field in which a transport format and a redundancy version of the protocol data unit is jointly encoded. Thereby, the second control channel signal is associated to a retransmission of the protocol data unit to the mobile terminal.

In one exemplary embodiment, the protocol data unit and the second protocol data unit are transmitted or received using the same HARQ process.

Another embodiment of the invention relates to a method for providing control signaling associated to a protocol data unit conveying user data in a mobile communication system. According to this method, a base station of the mobile communication system generates a control channel signal that comprises a control information field consisting of a number of bits representing:

a transport format and implicitly a redundancy version of the protocol data unit, if the transmission of the protocol data unit is an initial transmission of the user data, or a redundancy version of the protocol data unit, if the transmission of the protocol data unit is a retransmission of the user data.

Subsequently the base station transmits the control channel signal to at least one mobile terminal.

In a further embodiment of the invention, in both methods mentioned above, the base station may also transmit the protocol data unit to a mobile terminal or receiving the protocol data unit from the mobile terminal utilizing a HARQ retransmission protocol. In one example, the protocol data unit is transmitted or received using a HARQ process indicated in the control channel signal. In another example, the protocol data unit is transmitted or received using a HARQ process determined based on to the sub-frame number of the sub-frame conveying the protocol data unit. The protocol data unit may be transmitted or received using the physical radio resource or resources indicated in the control channel signal.

In one exemplary embodiment of the invention the mobile communication system is a multi-carrier system, such as for example an OFDM-based system, and the control channel signal is transmitted within the physical radio resources of a sub-frame allocated to the L1/L2 control channels of the multi-carrier system.

Furthermore, in another exemplary embodiment of the invention the protocol data unit is transmitted in the same sub-frame as the associated control channel signal.

Though the exemplary embodiments described herein are mainly focusing on outlining the relation between one base station and one mobile terminal, it is apparent that the base station may be serving a plurality of mobile terminals, and a control channel signal is generated and transmitted by the base station for each mobile terminal or group of mobile terminals.

A further embodiment of the invention is related to the operation of the mobile terminal. Accordingly, a method is provided in which a mobile terminal receive a sub-frame of physical radio resources comprising a control channel signal destined to the mobile terminal. The control channel signal comprises a control information field in which a transport format and a redundancy version of a protocol data unit are jointly encoded. The mobile terminal next determines the transport format and the redundancy version for the protocol data packet conveying user data based on the received control channel signal, and receives or transmits the protocol data packet on at least one physical radio resource using the transport format and the redundancy version of the protocol data packet indicated in the received control information field.

In one example, the transport format is transport block size information of the protocol data unit, and the received control channel signal comprises a resource allocation field indicating the physical radio resource or resources allocated to the mobile terminal. Accordingly, the mobile terminal may determine the transport block size of the protocol data unit depending on the information comprised in the resource allocation field and the control information field.

In another example, the control channel signal indicates the protocol data packet to be a retransmission (e.g. new data indicator not set) of user data and wherein the method further comprises the step of transmitting a positive acknowledgment for the received protocol data packet to the base station, if the control channel signaling associated to the initial transmission for the user data has been missed. Hence, even though the mobile terminal has not received the control channel signal and could not receive the associated transmission of the user data, the mobile terminal may acknowledge "successful reception" of the user data and may for example rely on upper layer protocols, such as for example the Radio Link Control (RLC) protocol, to take care of handling retransmission.

In case the protocol data unit is a retransmission, according to another example, the mobile terminal may reuse the transport format information of the protocol data unit indicated in a control channel signal for the initial transmission for the transmission or reception of the retransmission of the protocol data unit. Accordingly, the control channel signal may be "only" indicating the redundancy version of the retransmission (though one may still consider the control channel signal to implicitly indicate the transport format).

In another exemplary embodiment of the invention, the information bits in the control information field of the control channel signal are associated to a single reference information indicating a transport format and a redundancy version used for transmitting the protocol data unit associated to the respective value represented by the information bits of the control information field for initial transmissions and retransmissions of the protocol data packet.

In a further embodiment of the invention relates to the operation of the mobile terminal. In this embodiment, the mobile terminal receives a sub-frame of physical radio resources comprising a control channel signal. The control channel signal thereby comprises a control information field consisting of a number of bits representing:

a transport format and implicitly a redundancy version of the protocol data unit, if the transmission of the protocol data unit is an initial transmission of the user data, or a redundancy version of the protocol data unit, if the transmission of the protocol data unit is a retransmission of the user data.

Next, the mobile terminal determines (based on the received control channel signal) the transport format of and the redundancy version for the protocol data packet conveying user data, and further receive or transmits the protocol data packet on at least one physical radio resource using the transport format and the redundancy version of the protocol data packet indicated in the received control information field.

In this exemplary embodiment, the information bits of the control information are associated to two different reference information (based on which the control information field content is interpreted). If the transmission of the protocol data packets is an initial transmission, the first reference information is utilized when determining the transport format and the redundancy version of the protocol data packet. If the transmission of the protocol data packets is a retransmission, the second reference is used when determining the transport format and the redundancy version of the protocol data packet.

In one example, the first reference information indicates a transport format associated to the respective value represented by the information bits of the control information field, and the second reference information indicates a redundancy version associated to the respective value represented by the information bits of the control information field.

Another embodiment of the invention provides a base station for providing control signaling associated to a protocol data unit conveying user data in a mobile communication system. The base station comprises a processing unit for generating a control channel signal comprising a control information field in which a transport format and a redundancy version of the protocol data unit is jointly encoded, and a transmitter unit transmitting control signaling comprising the control channel signal to at least one mobile terminal.

Further, another embodiment of the invention relates to a mobile terminal for use in a mobile communication system, whereby the mobile terminal comprises a receiver unit for receiving a sub-frame of physical radio resources comprising a control channel signal destined to the mobile terminal. The control channel signal comprises a control information field in which a transport format and a redundancy version of a protocol data unit is jointly encoded, as mentioned previously herein. The mobile terminal also comprises a processing unit for determining based on the received control channel signal the transport format of and the redundancy version for the protocol data packet conveying user data, and a transmitter unit for transmitting the protocol data packet on at least one physical radio resource using the transport format and the redundancy version of the protocol data packet indicated in the received control information field.

In an alternative embodiment, the mobile terminal comprises a receiver unit for receiving a sub-frame of physical radio resources comprising a control channel signal destined to the mobile terminal, and a processing unit for determining based on the received control channel signal the transport format of and the redundancy version for the protocol data packet conveying user data. Furthermore, the receiver unit is capable of receiving the protocol data packet on at least one physical radio resource using the transport format and the redundancy version of the protocol data packet indicated in the received control information field.

Moreover, the invention according to other exemplary embodiments relates to the implementation of the methods described herein in software and hardware. Accordingly, another embodiment of the invention provides a computer readable medium storing instructions that, when executed by a processor unit of a base station, cause the base station to generate a control channel signal comprising a control information field in which a transport format and a redundancy version of the protocol data unit is jointly encoded, and to transmit the control channel signal to at least one mobile terminal.

A further embodiment relates to a computer readable medium storing instructions that, when executed by a processor unit of a mobile terminal, cause the mobile terminal to receive a sub-frame of physical radio resources comprising a control channel signal destined to the mobile terminal, determine based on the received control channel signal the transport format of and the redundancy version for the protocol data packet conveying user data, and receive or transmit the protocol data packet on at least one physical radio resource using the transport format and the redundancy version of the protocol data packet indicated in the received control information field.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF EXAMPLE EMBODIMENTS

Figure 1:
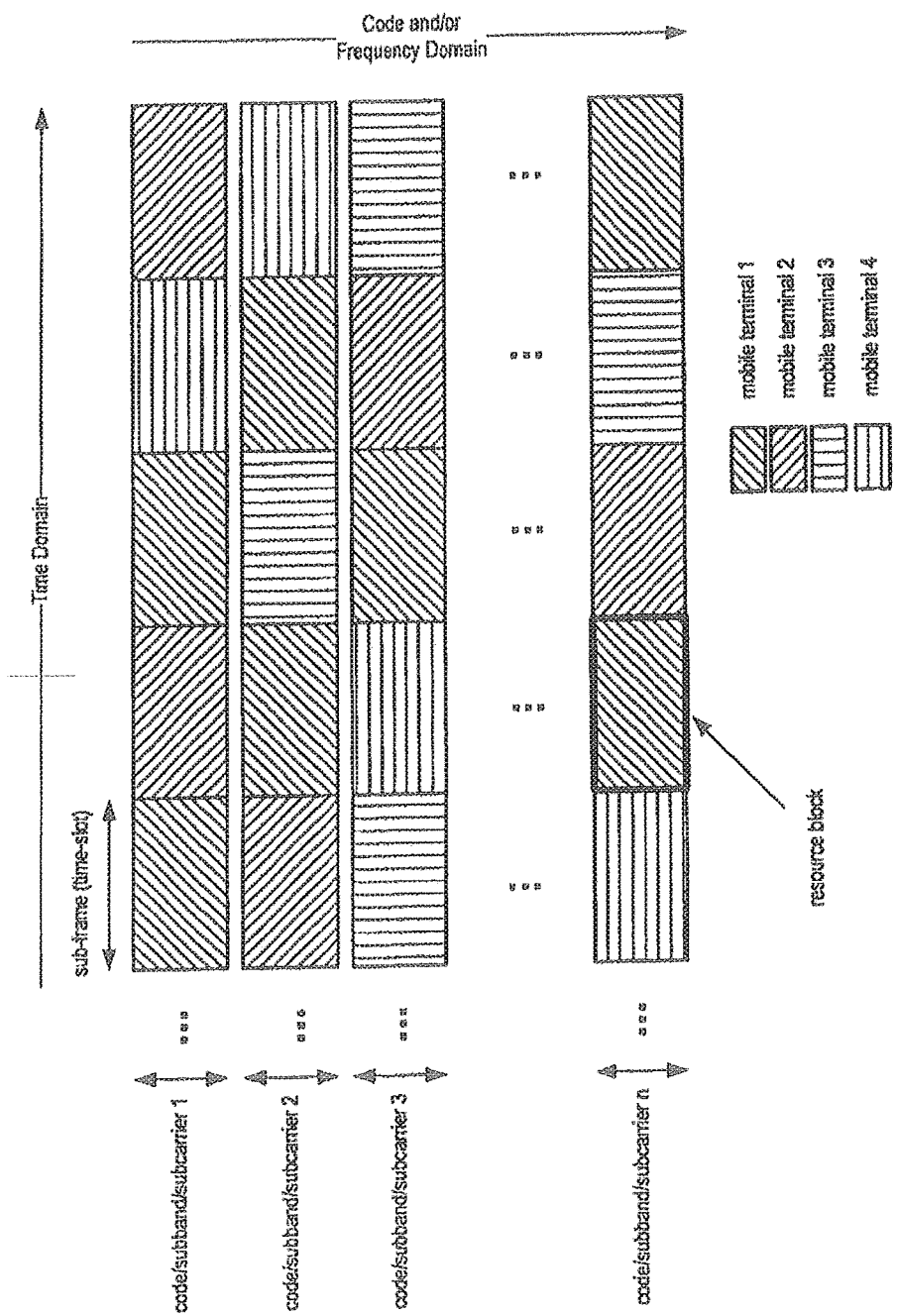
FIG. 1 shows an exemplary data transmission to users in an OFDMA system in localized mode (LM) having a distributed mapping of L1/L2 control signaling.

The following paragraphs will describe various embodiments of the invention. For exemplary purposes only, most of the embodiments are outlined in relation to an (evolved) UMTS communication system according to the SAE/LTE discussed in the Technical Background section above. It should be noted that the invention may be advantageously used for example in connection with a mobile communication system such as the SAE/LTE communication system previously described or in connection with multi-carrier systems such as OFDM-based systems, but the invention is not limited to its use in this particular exemplary communication network.

Before discussing the various embodiments of the invention in further detail below, the following paragraphs will give a brief overview on the meaning of several terms frequently used herein and their interrelation and dependencies. Generally, a protocol data unit may be considered a data packet of a specific protocol layer that is used to convey one or more transport blocks. In one example, the protocol data unit is a MAC Protocol Data Unit (MAC PDU), i.e. a protocol data unit of the MAC (Medium Access Control) protocol layer. The MAC PDU conveys data provided by the MAC layer to the PHY (Physical) layer. Typically, for a single user allocation (one L1/L2 control channel—PDCCH—per user), one MAC PDU is mapped onto one transport block (TB) on Layer 1. A transport block defines the basic data unit exchanged between Layer 1 and MAC (Layer 2). Typically, the when mapping a MAC PDU onto a transport block one or multiple CRCs are added. The transport block size is defined as the size (number of bits) of a transport block. Depending on the definition, the transport size may include or exclude the CRC bits.

in general, the transport format defines the modulation and coding scheme (MCS) and/or the transport block size, which is applied for the transmission of a transport block and is, therefore, required for appropriate (de)modulation and (de)coding. In a 3GPP-based system as for example discussed in 3GPP TR 25.814, the following relationship between the modulation and coding scheme, the transport block size and the resource allocation size is valid:

$$TBS = C \cdot R \cdot M \cdot N_{RE}$$

where $N_{RE}$ is the number of allocated resource elements (RE)—one RE being identical to one modulation symbol --, CR is the code rate for encoding the transport block, and M is the number of bits mapped onto one modulation symbol, e.g. M=4 for 16-QAM.

Due to this relationship described above, the L1/L2 control signaling may only need to indicate either the transport block size or the modulation and coding scheme. In case the modulation and coding scheme should be signaled, there are several options how to implement this signaling. For example, separate fields for modulation and coding or a joint field for signaling both, the modulation and coding parameters may be foreseen. In case the transport block site should be signaled, the transport block size is typically not explicitly signaled, but is rather signaled as a TBS index. The interpretation of the TBS index to determine the actual transport block size may for example depend on the resource allocation size.

In the following, the transport format field on the L1/L2 control signaling is assumed to be indicating either the modulation and coding scheme or the transport block size. It should be noted, that the transport block size for a given transport block typically does not change during transmissions. However, even if the transport block size is not changed, the modulation and coding scheme may change between transmissions, e.g. if the resource allocation size is changed (as apparent for the described relationship above).

It should be also noted that in some embodiments of the invention, for retransmissions the transport block size is typically known from the initial transmission. Therefore, the transport format (MCS and/or TBS) information (even if the modulation and coding scheme changes between transmissions) does not have to be signaled in retransmissions, since the modulation and coding scheme can be determined from the transport block size and the resource allocation size, which can be determined from the resource allocation field.

Figure 4:
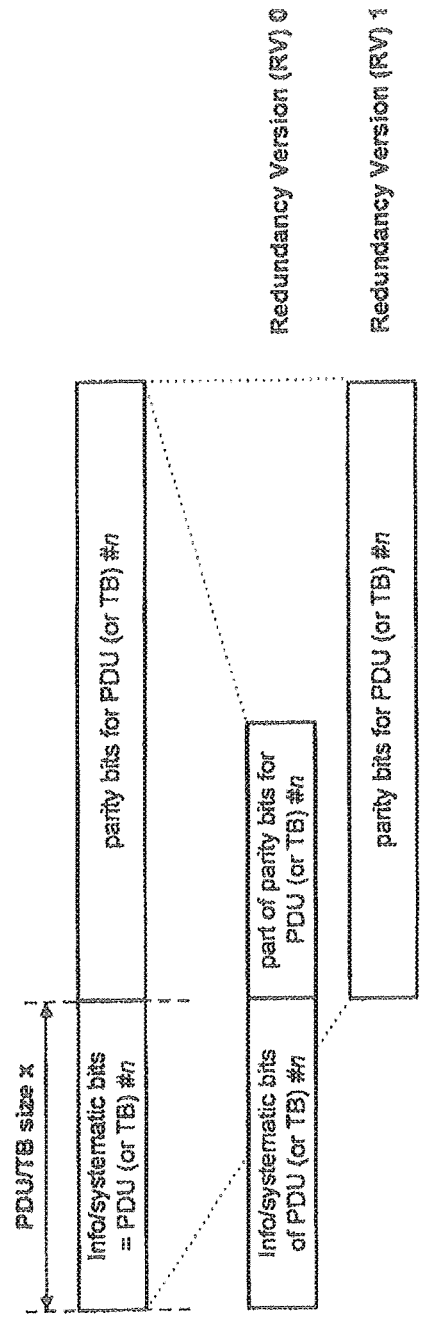

A redundancy version denotes a set of encoded bits generated from a given transport block, as shown in FIG. 4. In systems, where the code rate for the data transmission is generated by a fixed rate encoder and a rate matching unit (e.g. in HSDPA of UMTS or LTE systems), different redundancy versions are generated for a single transport block (or protocol data unit) by selecting different sets of available encoded bits, where the set size (number of selected bits) depends on the actual code rate (CR) for the data transmission. In case the actual code rate for a transmission (or retransmission) is higher than the encoder rate, a redundancy version is constructed out of a subset of encoded bits. In case the actual code rate for a transmission (or retransmission) is lower than the encoder rate, a redundancy version is typically constructed out of all encoded bits with selected bits being repeated.

A constellation version denotes the constellation diagram being applied for the modulation of the data transmission. In some cases, this may simply refer to a specific bit-to-symbol mapping for a given modulation scheme. In other cases, this may refer to a specific bit operations by interleaving and/or inversion of bit values in order to achieve a similar effect as by applying a specific bit-to-symbol mapping (see for example EP 1 293 059 B1 or EP 1 313 248 B1 or 3GPP TS 25.212, "Multiplexing and Channel Coding (FDD)", version 7.6.0, September 2007 available at http://www.3gpp.org).

A New Data Indicator (NDI) denotes a flag (or field) indicating whether a transmission of a transport block (or protocol data unit) is an initial transmission or a retransmission. If the NDI is set, the transmission of a transport block (or protocol data unit) is an initial transmission. In some implementations, the new data indicator is a 1-bit sequence number (SN), which is incremented every other transport block (or protocol data unit). In case of using a single bit for the NDI/SN the increment is identical to toggling the bit. Generally, however, a sequence number may comprise more than one bit.

One main aspect of the invention is to suggest a new format for the control channel information. According to this aspect, the transport format/transport block size/payload size/modulation and coding scheme and the redundancy version/constellation version for the associated transmission of the user data (typically in form of a protocol data unit) is provided in a single field of the control channel information. The control channel information may for example be L1/L2 control information/a L1/L2 control channel signal that is transmitted on the PDCCH (Physical Downlink Control CHannel) of a 3GPP LTE system.

It should be noted that for simplicity it is referred to transport format and redundancy version in most of the examples herein. However, in all embodiments of this invention the term "transport format" means either one of "transport format", "transport block size", "payload size" or "modulation and coding scheme". Similarly, in all embodiments of this invention the term "redundancy version" can be replaced by "redundancy version and/or constellation version".

In addition, some embodiment of the invention foresee to combine the transport format, the redundancy version and additionally HARQ related information ((Retransmission/HARQ) sequence number or new data indicator—NDI within a single field of the control channel information.

There are two basic approaches suggested herein. According to different embodiments of the invention, a joint encoding of transport format and redundancy version is provided or alternatively a shared signaling of transport format and redundancy version is used. In both cases, only a single control channel information field is provided for the transport format and the redundancy version, however the use of the field is different.

When using joint encoding, there is one common field for the transport format and the redundancy version defined in the control channel information/signal. The transport format and redundancy version are jointly coded, e.g. a field of N bits is used yielding $2^N$ values, which can be signaled. Out of the $2^N$ values M ($<2^N$) values are used to indicate a transport format which is for example associated to a given fixed or pre-configured redundancy version (In this case one could speak of an explicit signaling of the transport format and a simultaneous implicit signaling of the redundancy version). All or part of the remaining values is used to indicate additional redundancy versions that may be for example used for retransmissions of the protocol data unit.

The latter may for example be especially applicable in a system design, where the transport format of a transport block/protocol data unit does not change between initial and retransmission or can be derived from other information in the control channel signal for the retransmission and/or the initial transmission (for example, in some systems it may be possible to derive the transport format of a retransmission from the transport format and optionally resource allocation information related to the initial transmission—further also the information on the resource allocation for the retransmission may be taken into account). In this example, the control signaling for the retransmission may explicitly indicate the redundancy version of the protocol data unit used for its retransmission and implicitly yielding the transport format (i.e. the same transport format as used for the initial transmission of the protocol data unit that has been indicated in a previous control channel signal for the initial transmission or the transport format can be derived from other control channel signaling information as mentioned above).

As mentioned previously, as an additional enhancement, the new data indicator or sequence number may be additionally jointly coded with the transport format and redundancy version.

Utilizing the second approach of having a shared field for the transport format and the redundancy version defined in the control channel information structure, at one signaling instant the shared field is used to signal the transport format and at another signaling instant the shared field is used to signal the redundancy version.

Accordingly, when jointly encoding the transport format and the redundancy version only on single set of reference information to map the bit value indicated by the bit combination in the common control information field in the control channel signal to a respective combination of transport format and redundancy version of the protocol data unit providing the user data may be needed, irrespective of whether the transmission is an initial transmission of the protocol data unit or a retransmission thereof.

In case of having a shared control information field in the control channel signal, there may be two sets of reference information to map the bit value indicated by the bit combination in the common control information field to a respective combination of transport format and redundancy version, depending on whether the transmission is an initial transmission of the protocol data unit or a retransmission thereof. For example, in case there is a pre-configured or fixed redundancy version for the initial transmission, the control channel signal for the initial transmission may explicitly indicate the transport format of the initial transmission within the shared field. For some retransmissions, the transport format of the initial transmission may be reused, so that the control channel signal for the retransmission may "only" explicitly indicate the redundancy version of the retransmission (while the transport format may be considered implicitly identified or known from the control channel signal for the initial or any previous transmission).

One significant difference between the general concept of the invention and existing systems, such as 3GPP HSDPA, from the viewpoint of an efficient system operation is related to HARQ protocol errors. In HSDPA a lost transport block (MAC PDU), e.g. due to an ACK/NACK misdetection or a lost L1/L2 downlink control signaling carrying the scheduling information (TF, HARQ, etc.), comes at a high resource cost and high delay, since the RLC protocol taking care of these errors is slow and heavy. In LTE systems (which is one of the target systems for employing the this invention), the higher-layer RLC protocol is lightweight and fast, which allows designing the L1/L2 downlink control signaling to be less robust, which in turn allows for optimizations disclosed herein. As indicated above, one approach suggested herein is the use of a single/common field in the control channel information format to indicate the transport format and (at least implicitly) the redundancy version of the transmission of a protocol data unit and to jointly encode (at least) these two parameters using the bits of the common field. According to one exemplary embodiment of the invention, the common field in the control channel information may be assumed to consist of N bits so that $2^N$ values can be represented and signaled. Out of the $2^N$ values M ($<2^N$) values may be for example used to indicate a transport format associated with a given fixed or pre-configured redundancy version. All or part of the remaining values is/are used to indicate additional redundancy versions.

Table 3 below illustrates an example, where the common field (Signaled Value) consists of 4 bits. The first part (denoted TF range) of the total range of values representable by the 4 bits is used to indicate different transport formats that are associated to a given redundancy version (RV 0). The remaining values representable by the 4 bits form a second part (denoted RV range) and indicate a redundancy version of the respective transmission.

TABLE 3

| Signaled Value (binary) | Signaled Value (decimal) | TF (TBS) | RV | Ranges |
|---|---|---|---|---|
| 0000 | 0 | ... | 0 | TF |
| 0001 | 1 | ... | 0 | range |
| 0010 | 2 | ... | 0 | |
| 0011 | 3 | ... | 0 | |
| 0100 | 4 | ... | 0 | |
| 0101 | 5 | 100 | 0 | |
| 0110 | 6 | 120 | 0 | |
| 0111 | 7 | 150 | 0 | |
| 1000 | 8 | 200 | 0 | |
| 1001 | 9 | ... | 0 | |
| 1010 | 10 | ... | 0 | |
| 1011 | 11 | ... | 0 | |
| 1100 | 12 | ... | 0 | |
| 1101 | 13 | N/A | 1 | RV |
| 1110 | 14 | | 2 | range |
| 1111 | 15 | | 3 | |

In Table 3 above, all values of the TF range are assigned to a single redundancy version (RV 0) only. Of course, it may be also possible that the respective values/transport formats are associated to different redundancy versions. This is exemplified in FIG. 4 below.

TABLE 4

| Signaled Value (binary) | Signaled Value (decimal) | TF (TBS) | RV | Ranges |
|---|---|---|---|---|
| 0000 | 0 | ... | 0 | TF |
| 0001 | 1 | ... | 0 | range |
| 0010 | 2 | ... | 0 | |
| 0011 | 3 | ... | 0 | |
| 0100 | 4 | ... | 1 | |
| 0101 | 5 | 100 | 1 | |
| 0110 | 6 | 120 | 1 | |
| 0111 | 7 | 150 | 1 | |
| 1000 | 8 | 200 | 2 | |
| 1001 | 9 | ... | 2 | |
| 1010 | 10 | ... | 2 | |
| 1011 | 11 | ... | 2 | |
| 1100 | 12 | ... | 2 | |
| 1101 | 13 | N/A | 0 | RV |
| 1110 | 14 | | 1 | range |
| 1111 | 15 | | 2 | |

According to the example in Table 4, redundancy versions may be defined depending on the actual signaling value. In one embodiment, for small transport block sizes or low MCS levels, one specific redundancy version (RV 0) could be used and for larger transport block sizes/high MCS levels, another redundancy version (RV 1 or RV 2) are used. Furthermore, in another example, the same transport format may be associated to different redundancy versions.

In operation, when initially transmitting a protocol data unit (or transport block), the base station may send a control channel signal comprising a common TF/RV field having a value selected from the "TF range". Accordingly, the signaled value does not only identify a transport format of the protocol data unit but also indicates the respective redundancy version. If a protocol data unit is retransmitted, a value from the "RV range" indicating a specific redundancy version is signaled, as it may be assumed that the transport format is constant or known for all transmissions of a respective protocol data unit (transport block) to facilitate soft-combining by the HARQ protocol.

Alternatively, e.g. depending on the feedback of the receiver (e.g. the mobile station) of the protocol data unit provided to the transmitter (e.g. the base station) of the protocol data unit, the transmitter may decide to send the retransmission with the same transport format and redundancy version as the initial transmission. Using a reference table as shown in Table 3, the control channel signal for the retransmission may thus indicate the same value in the TF/RV field of the control channel signal as the control channel signal for the initial transmission (as the "RV range" does not allow to signal RV 0). If using a reference table as shown in Table 4, it should be noted that the "RV range" yields three the same three redundancy versions that are identified in the "TF range", so that the TF/RV field in the control channel signal may always a value of the "RV range" for the retransmissions.

In case there should be the possibility to send retransmissions with the same redundancy version as the initial transmission, e.g. due to using HARQ with Chase combining as a retransmission protocol for the protocol data units the following exemplary implementations may be foreseen.

In one exemplary implementation, any "TF range" value can be signaled in the control channel signal for retransmissions, even if the signaled value does not matching the TF (TBS) value of the transport block (or in other words the TF of the initial transmission of the protocol data unit). In this case, the receiver (e.g. mobile station) simply ignores the transport format that would be yielded by the signaled "TF range" value, and simply applies the signaled redundancy version. Accordingly, in order to distinguish when to ignore the signaled transport format, the receiver may evaluate the sequence number (field) or new data indicator first, so as to recognize whether the associated transmission of the protocol data unit is an initial transmission or a retransmission.

In another, second exemplary implementation, also for a retransmission the "TF range" value can be signaled that is matching the transport format (TBS) of the first, initial transmission. In this case, the receiver (e.g. mobile station) shall typically not ignore the signaled transport format (TBS) value, as this might help to discover error cases. If for example the receiver has missed the control signaling of the initial transmission (and hence missed also the first transmission of the protocol data unit/transport block), the receiver may try to decode the data based on the signaling for the retransmission, since the control signaling contains the transport format.

In a third exemplary implementation, the interpretation of the transport format (TBS) value in the common TF/RV field depends on the resource allocation field also comprised in the control channel information. This means that for a given resource allocation size, only a specific range of transport block sizes may be signaled (typically, the transport block size TBS is related to the amount of allocated resources—measured in resource blocks RBs—as follows: TBS=NRB, where N=1, 2, 3, . . . ). In case the resource allocation size changes between initial transmission and retransmissions, it may happen that it is not possible to signal the correct transport block size. In this case, it may be advantageous to include an "Out of Range" TF value in the reference table used at the receiver of the control channel signal to interpret the content of the TF/RV field. This latter case is exemplified in Table 5 below.

TABLE 5

| Signaled Value (binary) | Signaled Value (decimal) | TF (TBS) | RV | Ranges |
|---|---|---|---|---|
| 0000 | 0 | ... | 0 | TF |
| 0001 | 1 | ... | 0 | range |
| 0010 | 2 | ... | 0 | |

TABLE 5-continued

| Signaled Value (binary) | Signaled Value (decimal) | TF (TBS) | RV | Ranges |
|---|---|---|---|---|
| 0011 | 3 | ... | 0 | |
| 0100 | 4 | ... | 0 | |
| 0101 | 5 | 100 | 0 | |
| 0110 | 6 | 120 | 0 | |
| 0111 | 7 | 150 | 0 | |
| 1000 | 8 | 200 | 0 | |
| 1001 | 9 | ... | 0 | |
| 1010 | 10 | ... | 0 | |
| 1011 | 11 | ... | 0 | |
| 1100 | 12 | "Out of Range" | 0 | |
| 1101 | 13 | N/A | 1 | RV |
| 1110 | 14 | | 2 | range |
| 1111 | 15 | | 3 | |

In another, fourth exemplary implementation, it may be ensured that the same redundancy version as used for an initial transmission may be used for a retransmission by having including in the "RV range" a value that yields the same redundancy version as yielded by the values of the "TF range". This implementation is exemplified in Table 6 below, where the "RV range" also comprises a value ("1101") that is indicating use of redundancy RV 0.

TABLE 6

| Signaled Value (binary) | Signaled Value (decimal) | TF (TBS) | RV | Ranges |
|---|---|---|---|---|
| 0000 | 0 | ... | 0 | TF |
| 0001 | 1 | ... | 0 | range |
| 0010 | 2 | ... | 0 | |
| 0011 | 3 | ... | 0 | |
| 0100 | 4 | ... | 0 | |
| 0101 | 5 | 100 | 0 | |
| 0110 | 6 | 120 | 0 | |
| 0111 | 7 | 150 | 0 | |
| 1000 | 8 | 200 | 0 | |
| 1001 | 9 | ... | 0 | |
| 1010 | 10 | ... | 0 | |
| 1011 | 11 | ... | 0 | |
| 1100 | 12 | ... | 0 | |
| 1101 | 13 | N/A | 0 | RV |
| 1110 | 14 | | 1 | range |
| 1111 | 15 | | 2 | |

In another embodiment of the invention, the control channel signal also includes a new data indicator (indicating whether the data is new data/a new protocol data unit) or a sequence number of the protocol data unit, which allows the receiver to detect the transmission of new data/a new protocol data unit.

According to one example, the new data indicator or the sequence number may be transmitted in a separate field or flag in the control channel signal. In one exemplary implementation the sequence number field is one bit, i.e. incrementing is identical to toggling the flag. Similarly, the new data indicator may be implemented as a 1-bit field. In case, a new transport block is transmitted (initial transmission) the new data indicator value is set (e.g. to value 1) and, if a transport block is retransmitted, the new data indicator is not set (e.g. is set to value 0).

According to another exemplary implantation, the sequence number or new data indicator is jointly encoded together with the transport format and the redundancy version in a single, common field of the control channel signal. Hence, the NDI/SN field may be no longer required, which allows to reduce signaling overhead.

The joint encoding of the new data indicator (NDI) with the transport format and the redundancy version according to two exemplary embodiments of the invention is shown in Table 7 and Table 8. In Table 8, the use of redundancy version RV 0 may be considered to implicitly also indicate new data, i.e. could therefore also be interpreted as a NDI flag being set (e.g. NDI=1), and all other redundancy versions RVs (RV 1-3) indicate retransmissions, i.e. could be also interpreted as the NDI flag not being set (e.g. NDI=0).

TABLE 7

| Signaled Value (binary) | Signaled Value (decimal) | TF (TBS) | RV | NDI | Ranges |
|---|---|---|---|---|---|
| 0000 | 0 | ... | 0 | 1 | TF range |
| 0001 | 1 | ... | 0 | 1 | (new data |
| 0010 | 2 | ... | 0 | 1 | range) |
| 0011 | 3 | ... | 0 | 1 | |
| 0100 | 4 | ... | 0 | 1 | |
| 0101 | 5 | 100 | 0 | 1 | |
| 0110 | 6 | 120 | 0 | 1 | |
| 0111 | 7 | 150 | 0 | 1 | |
| 1000 | 8 | 200 | 0 | 1 | |
| 1001 | 9 | ... | 0 | 1 | |
| 1010 | 10 | ... | 0 | 1 | |
| 1011 | 11 | ... | 0 | 1 | |
| 1100 | 12 | ... | 0 | 1 | |
| 1101 | 13 | N/A | 0 | 0 | RV range |
| 1110 | 14 | | 1 | 0 | (retransmis- |
| 1111 | 15 | | 2 | 0 | sion range) |

TABLE 8

| Signaled Value (binary) | Signaled Value (decimal) | TF (TBS) | RV | NDI | Ranges |
|---|---|---|---|---|---|
| 0000 | 0 | ... | 0 | 1 | TF range |
| 0001 | 1 | ... | 0 | 1 | (new data |
| 0010 | 2 | ... | 0 | 1 | range) |
| 0011 | 3 | ... | 0 | 1 | |
| 0100 | 4 | ... | 0 | 1 | |
| 0101 | 5 | 100 | 0 | 1 | |
| 0110 | 6 | 120 | 0 | 1 | |
| 0111 | 7 | 150 | 0 | 1 | |
| 1000 | 8 | 200 | 0 | 1 | |
| 1001 | 9 | ... | 0 | 1 | |
| 1010 | 10 | ... | 0 | 1 | |
| 1011 | 11 | ... | 0 | 1 | |
| 1100 | 12 | ... | 0 | 1 | |
| 1101 | 13 | N/A | 1 | 0 | RV range |
| 1110 | 14 | | 2 | 0 | (retransmis- |
| 1111 | 15 | | 3 | 0 | sion range) |

Essentially, Table 7 is similar to Table 6 (so is Table 8 to Table 3), except for adding another column to the reference table indicating the identified NDI setting for a respective signaled value. In general, independent from the specific example given in Table 7, it should be recognized that the definition of two ranges of values ("TF range" and "RV range") also defines two ranges of values indicating, whether new data is sent or whether a retransmission is provided. Essentially, selecting a value from the "TF range" indicates a new transmission, and is thus equivalent to a new data indicator being set (or a sequence number being incremented). Similarly, selecting a value from the "RV range" indicates no new data being transmitted and is thus equivalent to new data indicator not being set (or a sequence number not being incremented). As the setting of a new data indicator (incrementing the sequence number) typically coincides with the transmission of an initial transmission of a protocol data unit or transport block respectively, for initial transmissions a value from the "TF range" should be signaled and for retransmissions, a value from the "RV range" should be signaled.

Another alternative approach to the joint encoding of transport format and redundancy version is the use of a shared field (which could be also referred to as a shared TF/RV field) in the control channel information format to be used for the signaling of transport format and redundancy version. In this alternative approach, according to another embodiment of the invention, it is assumed that the transport format is generally associated to a specific redundancy version for the initial transmission (or the redundancy version for the initial transmission is either fixed or pre-defined). Accordingly, in case of an initial transmission, the shared field is interpreted as signaling a transport format, as shown in Table 9, and so to say implicitly indicating a redundancy version of the respective transmission in a similar fashion as discussed in some examples above relating to the joint encoding approach.

Furthermore, it is also assumed, that the transport block size is not changing between initial transmission and retransmission of a protocol data unit or transport block. Hence, in case of a retransmission the shared field in the control channel signal is interpreted as a redundancy version, as shown in Table 10.

TABLE 9

| Signaled Value (binary) | Signaled Value (decimal) | TF (TBS) |
|---|---|---|
| 0000 | 0 | ... |
| 0001 | 1 | ... |
| 0010 | 2 | ... |
| 0011 | 3 | ... |
| 0100 | 4 | ... |
| 0101 | 5 | 100 |
| 0110 | 6 | 120 |
| 0111 | 7 | 150 |
| 1000 | 8 | 200 |
| 1001 | 9 | ... |
| 1010 | 10 | ... |
| 1011 | 11 | ... |
| 1100 | 12 | ... |
| 1101 | 13 | ... |
| 1110 | 14 | ... |
| 1111 | 15 | ... |

TABLE 10

| Signaled Value (binary) | Signaled Value (decimal) | RV |
|---|---|---|
| 0000 | 0 | RV 0 |
| 0001 | 1 | RV 1 |
| 0010 | 2 | RV 2 |
| 0011 | 3 | RV 3 |
| 0100 | 4 | RV 4 |
| 0101 | 5 | ... |
| 0110 | 6 | ... |
| 0111 | 7 | ... |
| 1000 | 8 | ... |
| 1001 | 9 | ... |
| 1010 | 10 | ... |
| 1011 | 11 | ... |
| 1100 | 12 | ... |
| 1101 | 13 | ... |
| 1110 | 14 | reserved |
| 1111 | 15 | reserved |

Comparing the joint encoding approach and the use of a shared field, the main difference between the approaches is the interpretation of the bits of the respective fields. In the joint encoding case, the same reference table is used for interpreting the bits of the common field in the control channel signal to determine transport format and redundancy version of a transmission, irrespective of whether the transmission is an initial transmission or a retransmission. Furthermore, in case of additionally jointly encoding the sequence number or a new data indicator, the value range that can be represented by the bits in the common field should be separated into two ranges so as to be able to differentiate between initial transmission and retransmission and to thereby recognize a new data indicator being set or a sequence number being incremented. In contrast, the shared field approach is using two different reference tables for the interpretation of the bits contained in the common field for transport format and redundancy version (see Tables 9 and 10 above), depending on whether an initial transmission or a retransmission is sent. This allows more freedom and flexibility to indicate a larger variety of transport formats and redundancy versions or may allow reducing the size of the signaling field.

However, the receiver of the control channel signal must be aware of whether an initial transmission or a retransmission is associated to the respective control channel signal. In theory, the receiver of the control channel signal may derive the information from its own feedback, which is however not necessarily very reliable as the feedback may be lost or misinterpreted.

Therefore, in one further embodiment of the invention, it is suggested that the control channel signal further comprises an additional sequence number field or new data indicator. In case of using a new data indicator, the interpretation of the shared TF/RV field depends on the value of the new data indicator field, i.e. returning to the example above, the receiver (e.g. mobile station) of the control channel signal either chooses Table 9 or table 10 for interpreting the shared TF/RV field depending on the setting of the new data indicator. Similarly, in case of having a sequence number field, the receiver selects the reference table for interpreting the content of the shared TF/RV field based on the sequence number being incremented or not.

Figure 5:
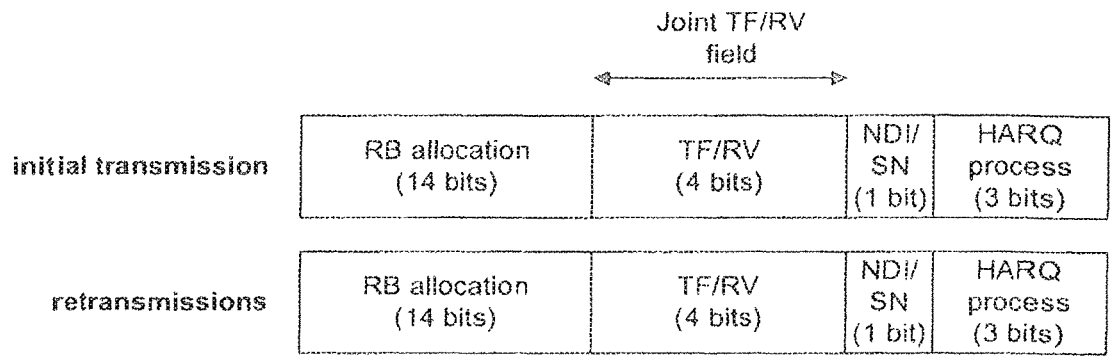
FIG. 5 shows an example of a control channel signal with a common field for jointly encoding transmission format and redundancy version of a protocol data unit according to one embodiment of the invention.
Figure 6:
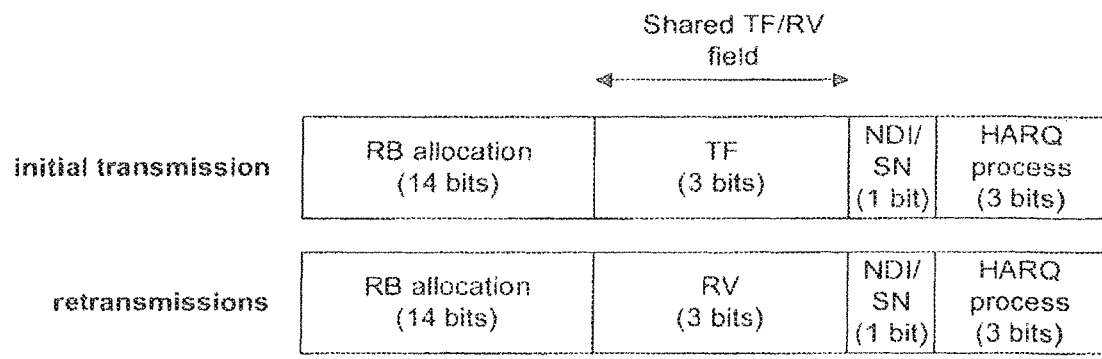
FIG. 6 shows an example of a control channel signal with a common, shared field for signaling the transmission format or the redundancy version of a protocol data unit according to one embodiment of the invention.

The differences between a joint encoding of transport format and redundancy version in a common field and the use of a shared field will be exemplified with respect to FIG. 5 and FIG. 6. In FIG. 5 a control channel signal according to one exemplary embodiment is shown. The control channel signal comprises a resource allocation field (RB allocation), a TF/RV field for jointly encoding transport format and redundancy version ("Joint TF/RV field"), a NDI/SN field and HARQ process field. The same configuration of the control channel signal is provided on FIG. 6.

In FIG. 5, the transport format and redundancy version are jointly encoded in a common field ("Joint TF/RV field") irrespective of whether the control channel information relate to an initial transmission or a retransmission. The four bits of the common field for transport format and redundancy version may for example represent the transport format and redundancy versions as outlined above with respect to Tables 3 to 6.

In FIG. 6, the shared field approach according to one exemplary embodiment of the invention is illustrated in further detail. The NDI/SN field may either comprise a new data indicator or a sequence number and is used to determine, whether the control channel information relates to an initial transmission and which reference information are to be used for interpreting the content of the shared TF/RV field. If the control channel information is related to an initial transmission of a protocol data unit or transport block, the shared TF/RV field indicates the transport format thereof, as for example shown in Table 9 above. If the control channel information is related to a retransmission, the shared TF/RV field indicates the redundancy version of the protocol data unit, as for example shown in Table 10 above.

Figure 10:
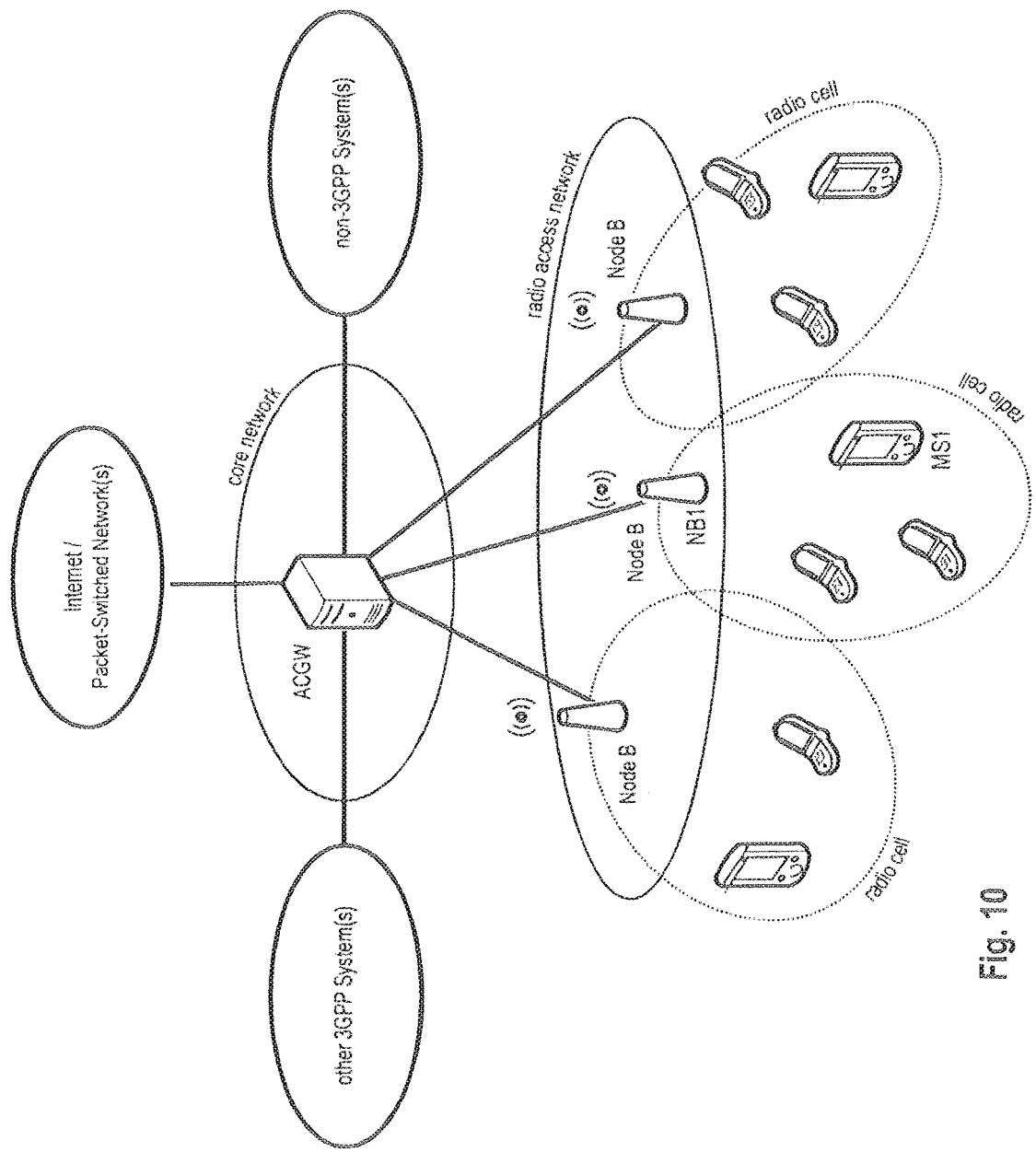
FIG. 10 shows a mobile communication system according to one embodiment of the invention, in which the ideas of the invention may be implemented.

Next, operation of the transmitter of the control channel signal according to one of the various embodiments described herein and the receiver thereof will be described in further detail, thereby exemplarily relating to the case of downlink data transmission. For exemplary purposes a network as exemplified in FIG. 10 may be assumed. The mobile communication system of FIG. 10 is considered to have a "two node architecture" consisting of at least one Access and Core Gateway (ACGW) and Node Bs. The ACGW may handle core network functions, such as routing calls and data connections to external networks, and it may also implement some RAN functions. Thus, the ACGW may be considered as to combine functions performed by GGSN and SGSN in today's 3G networks and RAN functions as for example radio resource control (RRC), header compression, ciphering/integrity protection.

The base stations (also referred to as Node Bs or enhanced Node Bs=eNode Bs) may handle functions as for example segmentation/concatenation, scheduling and allocation of resources, multiplexing and physical layer functions, but also RRC functions, such as outer ARQ. For exemplary purposes only, the eNodeBs are illustrated to control only one radio cell. Obviously, using beam-forming antennas and/or other techniques the eNodeBs may also control several radio cells or logical radio cells.

Figure 2:
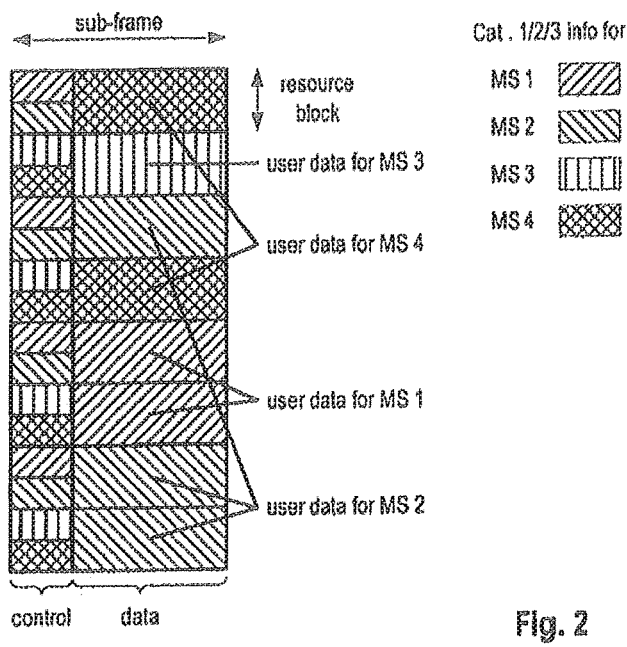
FIG. 2 shows an exemplary data transmission to users in an OFDMA system in localized mode (LM) having a distributed mapping of L1/L2 control signaling.
Figure 3:
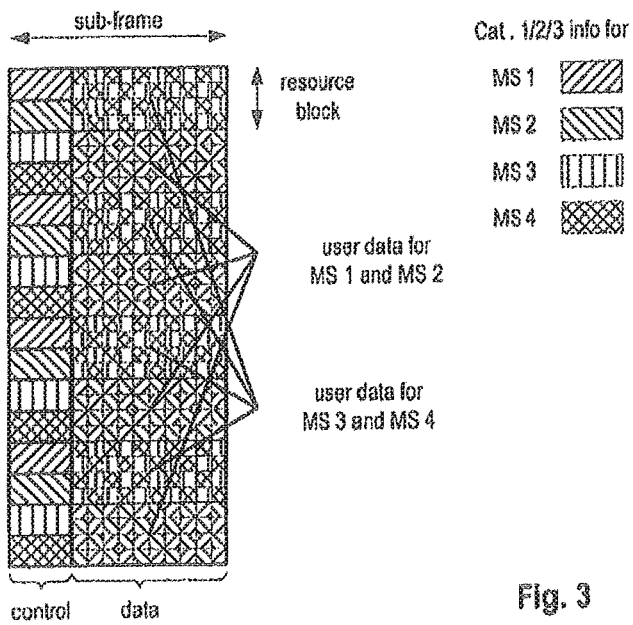
FIG. 3 shows an exemplary data transmission to users in an OFDMA system in distributed mode (DM) having a distributed mapping of L1/L2 control signaling, FIG. 4 exemplarily highlights the interrelation between transport block/protocol data unit and its different redundancy versions as well as the transport block size/protocol data unit size.

In this exemplary network architecture, a shared data channel may be used for communication of user data (in form or protocol data units) on uplink and/or downlink on the air interface between mobile stations (UEs) and base stations (eNodeBs). This shared channel may be for example a Physical Uplink or Downlink Shared CHannel (PUSCH or PDSCH) as known in LTE systems. However, it is also possible that the shared data channel and the associated control channels are mapped to the physical layer resources as shown in FIG. 2 or FIG. 3.

The control channel signals/information may be transmitted on separate (physical) control channels that are mapped into the same subframe to which the associated user data (protocol data units) are mapped or may be alternatively sent in a subframe preceding the one containing the associated information. In one example, the mobile communication system is a 3GPP LTE system, and the control channel signal is L1/L2 control channel information (e.g. information on the Physical Downlink Control CHannel—PDCCH). Respective L1/L2 control channel information for the different users (or groups of users) may be mapped into a specific part of the shared uplink or downlink channel, as exemplarily shown in FIGS. 2 and 3, where the control channel information of the different users is mapped to the first part of a downlink subframe ("control").

Figure 8:
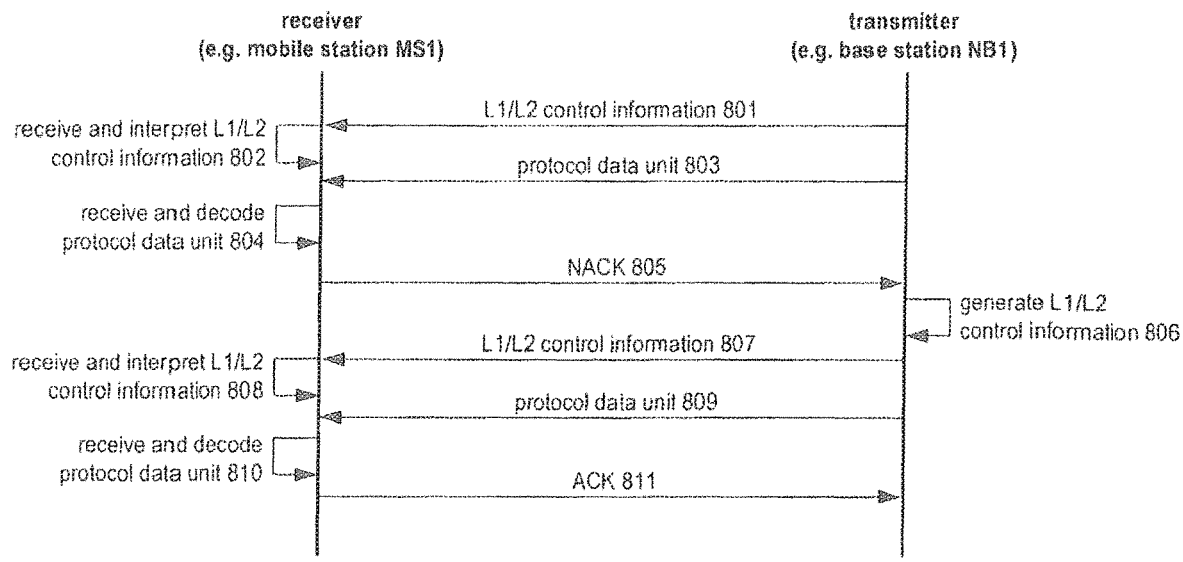
FIG. 8 shows an exemplary, typical message flow between a transceiver and receiver of a control channel signal according to an exemplary embodiment of the invention.

FIG. 8 shows a message exchange and tasks performed by a transmitted and a receiver of a control channel signal according to an exemplary embodiment of the invention. The message exchange may be performed in the mobile communication network shown in FIG. 10. Accordingly, as the example in FIG. 8 is relating to the downlink data transmission, the transmitter shown in FIG. 8 may be assumed to correspond to base station/Node B NB1 in FIG. 10 and the receiver shown in FIG. 8 may be assumed to correspond to mobile station/UE MS1 in FIG. 10. Generally, it may be assumed in FIG. 8 that a retransmission protocol, such as Hybrid ARQ, is used between the transmitter (here: base station NB1) and receiver (here: mobile station MS1) of the data (protocol data unit) so as to ensure successful decoding of the data at the receiver.

Mobile station MS1 is first receiving 801 the PDCCH and obtains a L1/L2 control channel signal. Subsequently, the mobile station MS1 interprets (or decodes) 802 the content of L1/L2 control channel signal. The control channel signal may be assumed to have a format as exemplified in FIG. 6. Next, the mobile station MS1 receives and tries to decode 804 the protocol data unit transmitted 803 on the associated downlink data channel with the parameters indicated by the L1/L2 control channel signal.

In case the mobile station MS1 can decode the protocol data unit successfully (known due to correct CRC), it transmits an ACK on the uplink. Alternatively, the mobile transmits 805 a NACK on the uplink, if it has not decoded the data correctly (known due to false CRC). In case mobile station MS1 did not receive (decode correctly) the control channel signal from the PDCCH, it does not transmit an ACK or NACK on the uplink (DTX).

In case of receiving a NACK at the base station NB1, same will provide a retransmission of the protocol data unit to the mobile station. As the retransmission of the protocol data unit is exemplarily assumed to be another redundancy version of the same protocol data unit, the base station NB1 generates 806 a control channel signal for the retransmission and transmits 807, this control channel signal and the retransmission of the protocol data unit 809 to mobile station MS1. Similar to steps 802 and 804, mobile station MS1 receives 808 the control channel signal for the retransmission and uses the parameters indicated therein to receive and decode 810 the retransmission of the protocol data unit. As it is assumed that the protocol data unit may be correctly decoded after having received the retransmission, mobile station MS1 informs 811 the base station NB1 on the successful (unsuccessful) decoding by means of an ACK (NACK).

Figure 9:
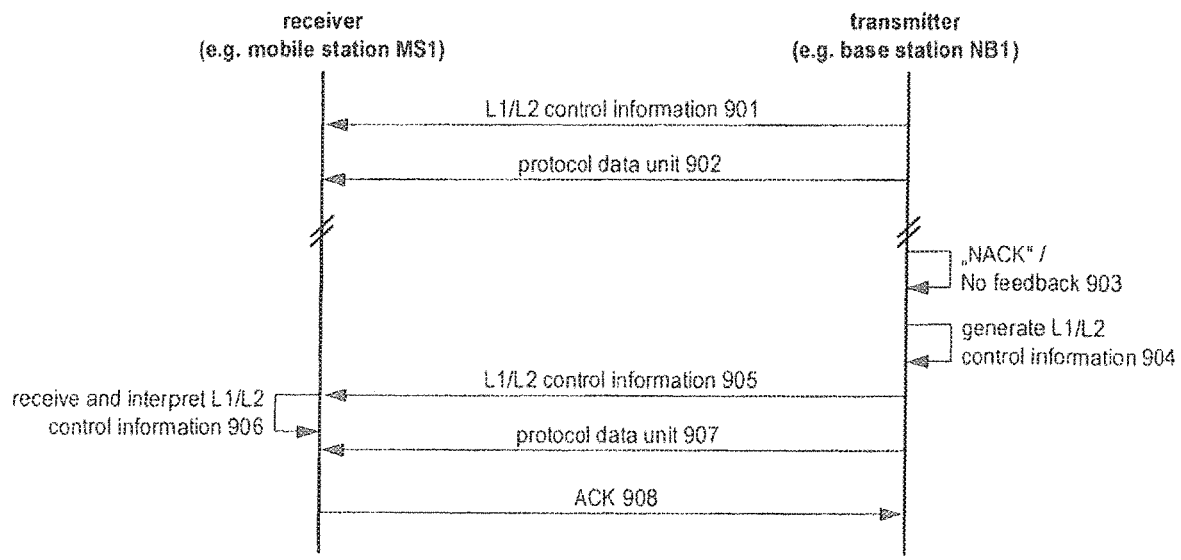
FIG. 9 shows an exemplary message flow between a transceiver and receiver of a control channel signal in which the retransmission protocol operation of the receiver is optimized according to an exemplary embodiment of the invention.

In a further embodiment, some further improvement to the retransmission protocol is suggested. This improvement will be outlined with the exemplary signaling flow and data exchange as illustrated in FIG. 9. It may be assumed that the retransmission protocol is provided on the Medium Access Layer (MAC) of the mobile communication system and that another higher layer protocol in the protocol stack provides another retransmission function to ensure successful data delivery. For example, this higher layer protocol may be the Radio Link Control (RLC) protocol.

Generally, if a mobile station misses 901 the control signaling (e.g. on the PDCCH) for the initial transmission of a protocol data unit (e.g. MAC PDU), it may also not receive 903 the initial transmission of the protocol data unit as well. Furthermore, the mobile station is also not aware of the transport format that will be used for the transmission and retransmissions of the protocol data unit and provides no feedback to the transmitting base station.

In case the base station does not receive any feedback for the initial transmission, a typical implementation of the scheduler unit of the base station considers 903 this absence of feedback as a NACK (two-state ACK/NACK receiver) and the base station generates 904 and transmits 905, another L1/L2 control signaling for the retransmission of the protocol data unit.

If the mobile station subsequently receives 906 this L1/L2 control signaling for the retransmission. Assuming now that there is a common field for the transport format and the redundancy version within the control signaling, the bits in the common TF/RV field do not yield the transport format (e.g. transport block sizes, MCS, etc.) of the protocol data unit, but may only indicate the redundancy version (see for example Tables 3 to 8 and assuming that a value of the "RV range" is signaled for retransmission or see Table 9 for the shared TF/RV field approach). Even though the mobile station is not capable of receiving the retransmission 907 of the protocol data unit, according to this embodiment of the invention, the mobile station sends 908 a positive acknowledgement (ACK) in order to abort the transmission of the current protocol data unit (MAC PDU), since otherwise (transmitting NACK) the base station would continue with retransmissions without the mobile terminal having a chance to correctly decode the transport block. The transmission of an ACK causes the transport block being lost, however retransmission of this transport block (protocol data unit) can be taken care of by higher layer (ARQ) protocols, if available (e.g. RLC).

A similar behavior can for example also be implemented in case the base station (or rather the scheduling unit) has the capability to not only detect ACK/NACKs from but also a transmitted DTX (i.e. no transmission of ACK/NACK)—i.e. a three-state ACK/NACK/DTX receiver—for situations where the mobile station missed the control signaling on the PDCCH, but due to an error in receiving/decoding the feedback—the base station wrongly detects a NACK instead of DTX. In this case the base station will send a retransmission for the protocol data packet together with an associated control channel signal indicating the transmission to be a retransmission, similar as for the 2-state ACK/NACK receiver case described above. In this case, the mobile station may detect a protocol error and sends a positive acknowledgement to abort the retransmissions. In case the base station correctly detects the DTX signal, the base station may transmit another initial transmission (indicating the transport format) of the same transport block or of a newly constructed transport block.

The exemplary embodiments discussed above have been mainly focused on L1/L2 control signaling for downlink data transmission. Also in case of uplink data transmissions, the L1/L2 control signaling may be transmitted in the downlink. As the transmission of the (user) data is on another link (uplink), the transmissions of the data may take place on different sub-frames numbers than the associated control signaling (because uplink and downlink may not really be synchronized, i.e. the timing of the uplink and downlink sub-frames are different). In any case there needs to be a well-defined mapping of the sub-frame the control signaling takes place and the sub-frame the actual data transmission takes place. Accordingly in TDD systems, the subframes may be different for uplink and for downlink.

In the following further options and improvements to the L1/L2 control signaling discussed previously herein will be discussed.

Figure 11:
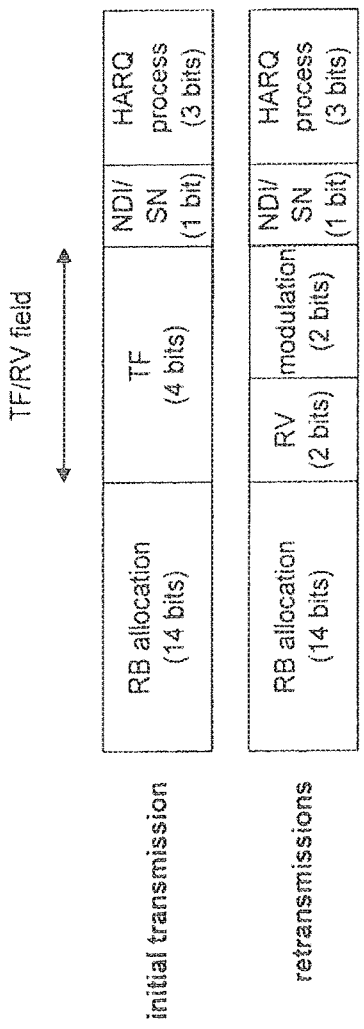
FIG. 11 shows another example of a control channel signal with a common, shared field for signaling the transmission format or the redundancy version of a protocol data unit according to one embodiment of the invention.

Another embodiment of the invention relates to a further improvement of the use of a shared TF/RV field in the control channel signal. The number of signaling bits for the transport format (e.g. 4-7 bits) is typically larger than the bits needed for the redundancy (e.g. 1-3 bits). Therefore, in case of signaling the redundancy version for retransmissions some bits (or values) of the shared TF/RV field may for example be used to transmit other useful control information. For example, some or all bits not used for signaling the redundancy version may be used to signal:

the modulation scheme as shown in FIG. 11, e.g. in case the modulation scheme should be controlled for each retransmission independently. In this case the code rate for decoding can be determined from the transport block size known from a previous transmission (typically initial transmission), the signaled resource allocation (from which the resource allocation size can be determined) and the signaled modulation scheme.

additional restricted transport format related information, e.g. on modulation only, on the MCS level, on the TBS, etc.

Figure 7:
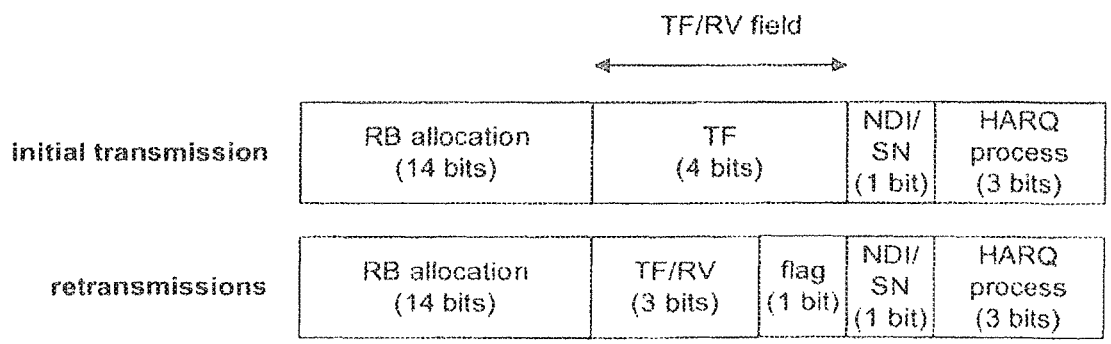
FIG. 7 shows another example of a control channel signal with a common, shared field for signaling the transmission format, the redundancy version or other information for a protocol data unit according to one embodiment of the invention.

MIMO HARQ sub-process information, as for example suggested in 3GPP TSG RAN WG1 #47 Tdoc. R1-063548, "MIMO HS-SCCH structure", November 2006 (available at http://www.3gpp.org and incorporated herein by reference). Assuming a MIMO mode supporting a 2 code word transmission and 2 HARQ processes, typically, the sub process number needs to be signaled in the L1/L2 control channel, which requires an additional bit for the HARQ process. Assuming that this bit is not required in initial transmissions, in retransmissions this bit can be signaled on the available space.

additional power control information for uplink/downlink control and data channels.

information on the resources used (by the base station) or to be used (by the UE) for the ACK/NACK signaling. This information may be e.g. an explicit indication of the resources or may be restricting the resources.

a flag bit indicating that the remaining bits in the shared field are used for RV information or e.g. for (restricted) TF information (see FIG. 7). This may be especially beneficial in case of self-decodable retransmissions, where the base station has the flexibility to choose what to signal in the retransmissions.

It should be noted, that in a further embodiment of the invention, control channel signaling is transmitted for initial transmissions and optionally in addition for selected retransmissions of a protocol data unit. Thus, some or all retransmissions may be transmitted without a control channel. In this case the control information for being able to receive the transmission of the associated protocol data unit may be derived from the control signaling for the initial transmission of the protocol data unit, from an earlier (re)transmission of the protocol data unit or the transport format and redundancy version for the retransmissions may be predefined. E.g. the resource allocation may be derived from the resource allocation of an earlier transmission (e.g. identical resource allocation or predefined hopping and resizing of the resource allocation). This implementation may be for example used for uplink data transmission with a synchronous HARQ protocol.

In comparison to conventional schemes the use of a common field for transport format and redundancy version (and optionally the NDI/SN) has the following advantages. The reduction of the L1/L2 control signaling overhead compared to having separate field in the control channel format for transport format, redundancy version and NDI/SN fields by the disclosed concept is up to 3 bits depending on the actual embodiment. Assuming L1/L2 control signaling formats as described in the co-pending PCT application no. PCT/EP2007/010755, "Configuration of Control Channels in a Mobile Communication System" (by the same applicant, filed Dec. 10, 2007) yielding sizes between ~25 and ~80 bits for the L1/L2 control channel signal, this results into an overhead reduction of 4-12%. Especially, for the small L1/L2 control signaling formats the reduction is beneficial (up to 12% reduction), since these are used for cell-edge mobile stations, where the (power and time-frequency) resources per L1/L2 control channel (PDCCH) are large due to power and MCS control of the L1/L2 control channel (PDCCH). Therefore, the concept of having a common field for encoding transport format and redundancy version (and optionally the NDI/SN) allows for an increased coverage and cell size.

Furthermore, the use of a common field for encoding transport format and redundancy version (and optionally the NDI/SN) in the control signaling also allows signaling more transport format sizes. Assuming that e.g. in total 8 bits for transport format, redundancy version and NDI/SN (5 bits TF, 2 bits RV, 1 bit NDI/SN) are used in a conventional system to code the respective fields individually, the joint encoding of transport format and redundancy version and still having a separate NDI/SN field allows using 7 bits for a common field. The prior art yields up to $2^5-1=31$ transport format values (one value reserved for "Out of Range"), whereas the joint encoding of transport format and redundancy version in a TF/RC field yields $2^7-3=125$ transport format values (assuming 3 values are to be reserved for signaling 3 RVs defined for retransmissions). This provides a significantly finer granularity of transport block sizes allowing e.g. for a lower MAC PDU padding overhead or a finer link adaptation by MCS selection. In case of additionally jointly encoding the NDI, the number of transport formats values further increases to $2^8-3=253$.

Furthermore, as discussed in several examples above, in implementations where the transport format (Transport Block Size) does not change for retransmissions, which should be the case, since otherwise soft-combining is not feasible, no transport format needs to be signaled for retransmissions. In a conventional design, the transport format is also signaled in retransmissions. In certain cases, the signaling of the transport format for retransmissions can help from recovering error cases (e.g. if the receiver missed the transmission of the control signaling for the initial transmission). However, these error cases are very unlikely for certain systems, and therefore, it is more efficient to avoid signaling of the transport format for retransmissions, which saves control signaling overhead.

The signaling of the transport format for retransmission typically causes additional overhead in the control signaling so as to account for error cases in case the resource allocation size is changing for retransmissions. In certain cases, it can happen that the transport format (transport blocks size), which needs to be signaled for retransmissions in conventional designs, is not within the range of the values that can be signaled after the update of the resource allocation. In this case, conventional systems typically define an "Out of Range" value to account for these situations. In some of the embodiments of the invention discussed herein, this "Out of Range" value is not required since the transport format (transport block size) is not signaled in retransmissions.

Another feature of the invention according to some embodiments of the invention is that it does not allow for a dynamic selection of the redundancy version for the initial transmission. This is not necessarily a drawback in comparison with conventional solutions (which may allow for a free choice of the redundancy version for initial transmissions), since dynamic redundancy version selection is typically not beneficial and may only be applied in rare cases.

Examples of mobile communication systems in which the principles of the invention outlined herein may be utilized are communication systems utilizing an OFDM scheme, a MC-CDMA scheme or an OFDM scheme with pulse shaping (OFDM/OQAM).

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Furthermore, it should be noted that the terms mobile terminal and mobile station are used as synonyms herein. A user equipment may be considered one example for a mobile station and refers to a mobile terminal for use in 3GPP-based networks, such as LTE.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

What is claimed is:

1. A method for operation of radio terminal in a radio communication system, the method comprising:
   receiving a physical downlink control signal comprising a control field and a new data indicator (NDI) field;
   determining that a value of the NDI field is one of a first value and a second value; and
   generating a physical uplink shared channel signal according to both a specific transport format and a specific redundancy version,
   wherein the control field is used to determine the specific transport format when the NDI field is determined to be the first value and the control field is used to determine the specific redundancy version when the NDI field is determined to be the second value.

2. The method of claim 1, wherein the specific redundancy version of the generated physical uplink shared channel signal is a pre-configured redundancy version when the NDI field is determined to be the first value.

3. The method of claim 1, wherein the specific transport format of the generated physical uplink shared channel signal is that of a previously transmitted physical uplink shared channel signal when the NDI field is determined to be the second value.

4. The method of claim 1, wherein the NDI field is a one-bit field.

5. The method of claim 1, wherein the first value of the NDI field is '1' and the second value of the NDI field is '0'.

6. The method of claim 1, wherein the specific transport format specifies a specific modulation and coding scheme for the generated physical uplink shared channel signal.

7. A method for operating a wireless terminal in a wireless communication system, the method comprising:
receiving a first instance of a physical downlink control channel signal,
wherein the physical downlink control channel signal is associated to a physical uplink shared channel signal and comprises a control information field encoding a transport format for use in a first instance of the associated physical uplink shared channel signal; and
receiving a second instance of the physical downlink control channel signal,
wherein the control information field that encoded the transport format in the first instance of the physical downlink control channel signal encodes a redundancy version for use in a second instance of the associated physical uplink shared channel signal.

8. The method of claim 7, wherein the redundancy version for use in the first instance of the physical uplink shared channel signal is a fixed value.

9. The method of claim 7, wherein the redundancy version for use in the first instance of the physical uplink shared channel signal is a pre-configured value.

10. The method of claim 7, wherein the transport format for use in the second instance of the physical uplink shared channel signal is the transport format encoded in the first instance of the physical downlink control channel signal.

11. The method of claim 7, wherein the first and second instances of the physical downlink control channel signal each further comprise a new data indicator field.

12. The method of claim 11, wherein the new data indicator field is a one-bit field.

13. The method of claim 12, wherein the value of the new data indicator field in the first instance of the physical downlink control channel signal is '1'.

14. The method of claim 12, wherein the value of the new data indicator field in the second instance of the physical downlink control channel signal is '0'.

15. The method of claim 8, wherein the first and second instances of the physical downlink control channel signal each further comprise a new data indicator field.

16. The method of claim 15, wherein the new data indicator field is a one-bit field.

17. The method of claim 16, wherein the value of the new data indicator field in the first instance of the physical downlink control channel signal is '1'.

18. The method of claim 16, wherein the value of the new data indicator field in the second instance of the physical downlink control channel signal is '0'.

19. The method of claim 9, wherein the first and second instances of the physical downlink control channel signal each further comprise a new data indicator field.

20. The method of claim 19, wherein the new data indicator field is a one-bit field.

21. The method of claim 20, wherein the value of the new data indicator field in the first instance of the physical downlink control channel signal is '1'.

22. The method of claim 20, wherein the value of the new data indicator field in the second instance of the physical downlink control channel signal is '0'.

23. The method of claim 7, wherein the wireless terminal is operable to generate the first instance of the physical uplink shared channel signal for transmission after receiving the first instance of the physical downlink control channel signal.

24. The method of claim 23, wherein the wireless terminal is operable to generate the second instance of the physical uplink shared channel signal for transmission after receiving the second instance of the physical downlink control channel signal.

25. The method of claim 23, wherein the first and second instances of the physical downlink control channel signal each further comprise a new data indicator field.

26. The method of claim 25, wherein the new data indicator field is a one-bit field.

27. The method of claim 26, wherein the value of the new data indicator field in the first instance of the physical downlink control channel signal is '1'.

28. The method of claim 26, wherein the value of the new data indicator field in the second instance of the physical downlink control channel signal is '0'.

* * * * *